(12) United States Patent
Cho et al.

(10) Patent No.: US 8,878,775 B2
(45) Date of Patent: Nov. 4, 2014

(54) DISPLAY DEVICE AND CONTROL METHOD THEREOF

(75) Inventors: Sanghyun Cho, Seoul (KR); Janghee Lee, Seoul (KR); Youk Kwon, Seoul (KR); Youngwan Lim, Seoul (KR); Sijin Kim, Seoul (KR); Joomin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 871 days.

(21) Appl. No.: 13/005,153

(22) Filed: Jan. 12, 2011

(65) Prior Publication Data

US 2011/0169734 A1   Jul. 14, 2011

(30) Foreign Application Priority Data

Jan. 12, 2010   (KR) .................. 10-2010-0002505

(51) Int. Cl.
*G09G 5/00* (2006.01)
*H04N 21/422* (2011.01)
*G06F 3/038* (2013.01)
*G06F 3/0346* (2013.01)
*H04N 5/44* (2011.01)

(52) U.S. Cl.
CPC ........ *G06F 3/0346* (2013.01); *H04N 21/42222* (2013.01); *G08C 2201/32* (2013.01); *H04N 2005/4428* (2013.01); *H04N 5/4403* (2013.01); *G06F 3/038* (2013.01)
USPC .............................. 345/156; 134/157; 134/169

(58) Field of Classification Search
USPC .......................................... 345/156, 157, 169
See application file for complete search history.

(56) References Cited

U.S. PATENT DOCUMENTS

| | | | | |
|---|---|---|---|---|
| 7,233,316 B2 * | 6/2007 | Smith et al. | .................... | 345/157 |
| 7,978,172 B2 * | 7/2011 | Fujita | .............................. | 345/156 |
| 8,436,813 B2 * | 5/2013 | Yoo et al. | ........................ | 345/158 |
| 8,456,421 B2 * | 6/2013 | Ni et al. | ......................... | 345/158 |
| 2007/0257885 A1 | 11/2007 | Liberty | | |
| 2008/0106517 A1 * | 5/2008 | Kerr et al. | ...................... | 345/158 |
| 2009/0066647 A1 | 3/2009 | Kerr et al. | | |
| 2009/0102836 A1 | 4/2009 | Cha et al. | | |
| 2012/0038549 A1 * | 2/2012 | Mandella et al. | .............. | 345/156 |

* cited by examiner

*Primary Examiner* — Jennifer Nguyen
(74) *Attorney, Agent, or Firm* — Birch, Stewart, Kolasch & Birch, LLP

(57) ABSTRACT

A display device and a control method thereof are discussed. A display device and a control method thereof according to an embodiment of the present invention comprise a display unit displaying an object; a receiver receiving a wireless signal from a three dimensional (3D) pointing device recognizing a three dimensional motion; and a controller calculating a trajectory of the 3D pointing device corresponding to at least one of an absolute coordinate area and a relative coordinate area based on the received wireless signal and determining a position of the displayed object according to a property of an area to which the trajectory belongs and displaying the determined position.

43 Claims, 34 Drawing Sheets

(a)

(b)

(a)

(b)

(a)

(b)

(c)

(d)

DISPLAY DEVICE AND CONTROL METHOD THEREOF

This application claims the benefit of Korean Patent Application No. 10-2010-0002505 filed on 12 Jan. 2010 which are hereby incorporated by reference.

BACKGROUND

1. Field

This document relates to relates to a display device and a control method thereof. More specifically, the present invention relates to a display device and a control method thereof, which calculates a trajectory of a 3D pointing device with respect to an absolute reference point if the 3D pointing device is positioned in an absolute coordinate area, while a trajectory of the 3D pointing device is calculated with respect to a relative reference point if the 3D pointing device moves in a relative coordinate area.

2. Related Art

As functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether the users can personally carry the terminals.

To support and enhance the functions of a terminal, a structural part and/or a software part of the terminal may be enhanced. As a variety of terminals including the mobile terminals provide complicated and various functions, a menu structure becomes also complicated. Furthermore, a function of displaying digital documents including web pages is added to the functions of the mobile terminals.

SUMMARY

The present invention relates to a display device and a control method thereof, which provides a trajectory of a 3D pointing device with respect to an absolute reference point if the 3D pointing device lies in an absolute coordinate area, while a trajectory of the 3D pointing device is calculated with respect to a relative reference point if the 3D pointing device moves in a relative coordinate area.

Technical aspects to be achieved by the present invention are not limited to those aspects described above. Other technical aspects not mentioned above should be understood clearly by those skilled in the art from the following descriptions.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description, and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
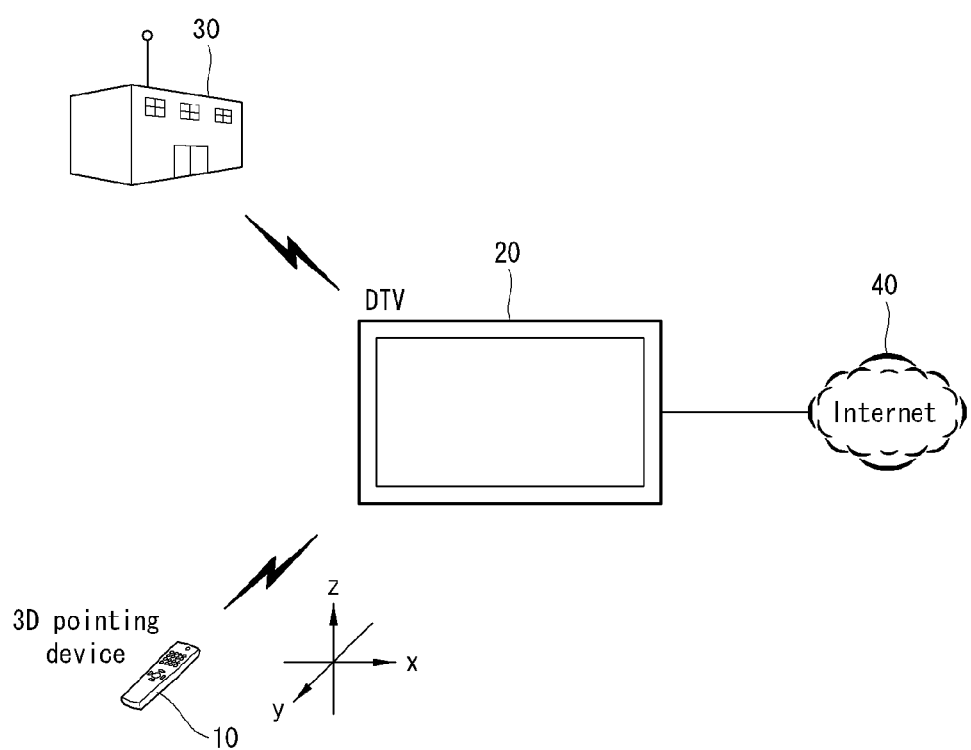
FIG. 1 illustrates a simplified system related to one embodiment of the present invention.

FIG. 1 illustrates a simplified system related to one embodiment of the present invention. As shown in FIG. 1, the present invention can be applied to a system comprising a three dimensional pointing device 10 and a display device (digital television, 20).

A 3D pointing device 10 senses 3D motion and transfers information about the sensed 3D motion to a display device 20. 3D motion can correspond to a command for controlling the display device 20. The user, by moving the 3D pointing device 10 in the empty space, can transfer a predetermined command to the display device 20. The 3D pointing device 10 can be equipped with various key buttons. The user can enter various commands through the key buttons. In the following, for the convenience of understanding the embodiment, the 3D pointing device 10 may be represented by a remote controller.

The display device 20 can receive broadcasting signals from a broadcasting station and output the received signals. In addition, the display device 20 can be equipped with a device able to connect to the Internet 40 through TCP/IP (Transmission Control Protocol/Internet Protocol). The display device 20 can be a digital TV.

Figure 2:
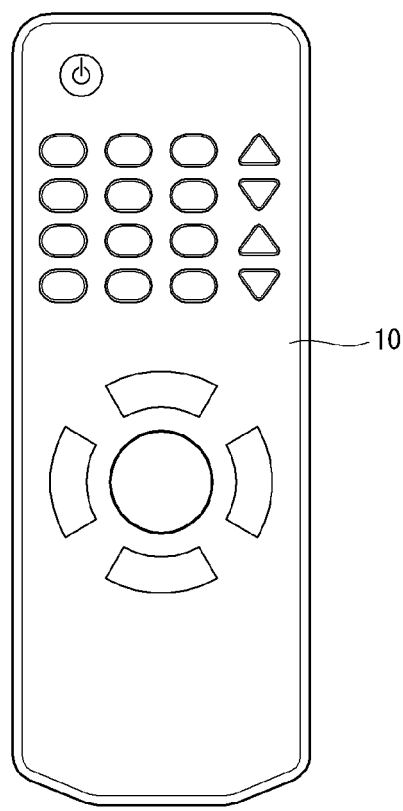
FIG. 2 illustrates an external view of a 3D pointing device of FIG. 1.
Figure 3:
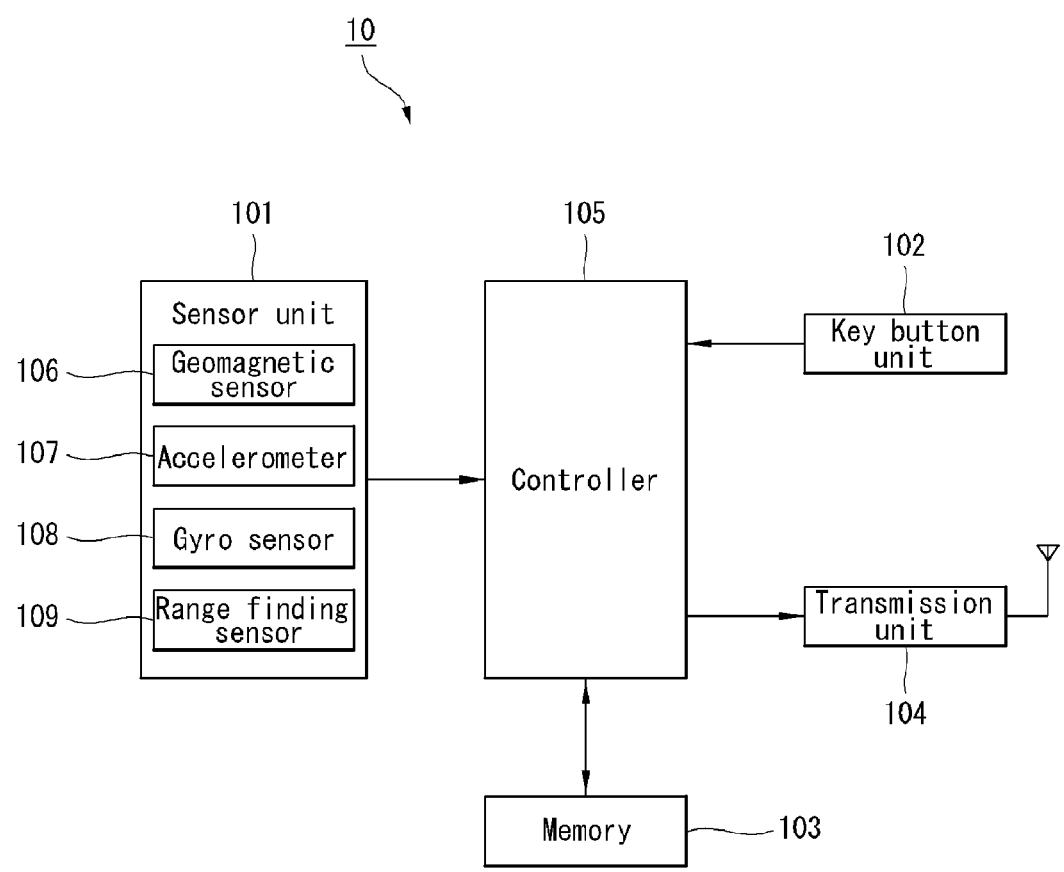
FIG. 3 is a block diagram of a 3D pointing device of FIG. 2.

FIG. 2 illustrates an external view of a 3D pointing device of FIG. 1 and FIG. 3 is a block diagram of a 3D pointing device of FIG. 2. With reference to the figures, a 3D pointing device 10 according to one embodiment of the present invention will now be described in detail.

A 3D pointing device 10 according to one embodiment of the present invention comprises a sensor unit 101, a key button unit 102, a memory 103, a transmission unit 104, and a controller 105.

The sensor unit 101 senses 3D motion of the 3D pointing device 10. The sensor unit 101 can comprise at least one or more of a geomagnetic sensor 106, an accelerometer 107, a gyro sensor 108, and a range finding sensor 109. Various sensors included in the sensor unit 101, through a combination of one or two or more thereof, can sense 3D motion of the 3D pointing device 10.

A geomagnetic sensor 106 measures azimuth angle. In other words, a geomagnetic sensor 106 is a sensor which measures azimuth angle by sensing a magnetic field established in a north-south direction of the earth. A geomagnetic sensor 106 can sense geomagnetism along three axes. North direction measured by the geomagnetic sensor 106 can correspond to magnetic north. However, although the geomagnetic sensor 106 may actually measure the direction of magnetic north, true north direction can be output through internal calculations.

An accelerometer 107 measures motion of a 3D pointing device 10 in the space. In other words, the accelerometer 107 is a sensor detecting change of acceleration and/or change of angular acceleration generated when the user moves the 3D pointing device 10. The accelerometer 107 can sense acceleration along three axes. By using the accelerometer 107, information about inclination of the 3D pointing device can be obtained.

A gyro sensor 108 is an inertial sensor which measures a rotational, angular speed of a 3D pointing device. In other words, a gyro sensor 108 can measure a current direction by using an inertial force of a rotating object. The gyro sensor can measure rotational, angular speeds along two axes or three axes.

If the geomagnetic sensor 106, the accelerometer 107, and the gyro sensor 108 are employed, it can be regarded that a nine axes sensor has been employed. In other words, a 3D pointing device 10 can sense azimuth angle through the geomagnetic sensor 106; a relative change along a straight line through the accelerometer 107; and a rotational, angular speed through the gyro sensor 108. For example, linear motion in a forward and backward direction of the 3D pointing device 10 can be sensed by using the accelerometer 107, while rotation of the 3D pointing device 10 can be sensed by using the geomagnetic sensor 106 and the gyro sensor 108.

If the nine axes sensor is employed, movement of a 3D pointing device 10 in the three dimensional space can be measured more accurately. For example, if the 3D pointing device 10 is moved by circling from a first position to a second position, the movement path and the angular trajectory of the 3D pointing device 10 can be obtained more accurately by using the nine axes sensor. If the movement path and the angular trajectory of the 3D pointing device 10 are obtained accurately, a display device 20 can be controlled more precisely. For example, a check box displayed on a display unit 151 can be selected accurately to conform to the user's intuition.

A range finding sensor 109 is a sensor which measures distance between the 3D pointing device 10 and the display device 20. In other words, a range finding sensor 109 measures distance between the position at which the user uses the 3D pointing device 10 and the position of the display device 20.

A key button unit 102 is a device for receiving a variety of information and commands from the user. For example, as shown in FIG. 2, the key button unit 102 can be installed in front of the 3D pointing device 10.

A memory 103 stores a predetermined program for controlling the overall operation of the 3D pointing device 10. Input/output data and various kinds of data processed can be stored temporarily or permanently when the overall operation of the 3D pointing device 10 is carried out by a controller 105.

A transmission unit 104 transmits information about motion sensed by the sensor unit 101 or a signal received through the key button unit 102 to the display device 20.

A controller 105 controls constituting components and supervises the overall operation of the 3D pointing device according to embodiments of the present invention.

Figure 4:
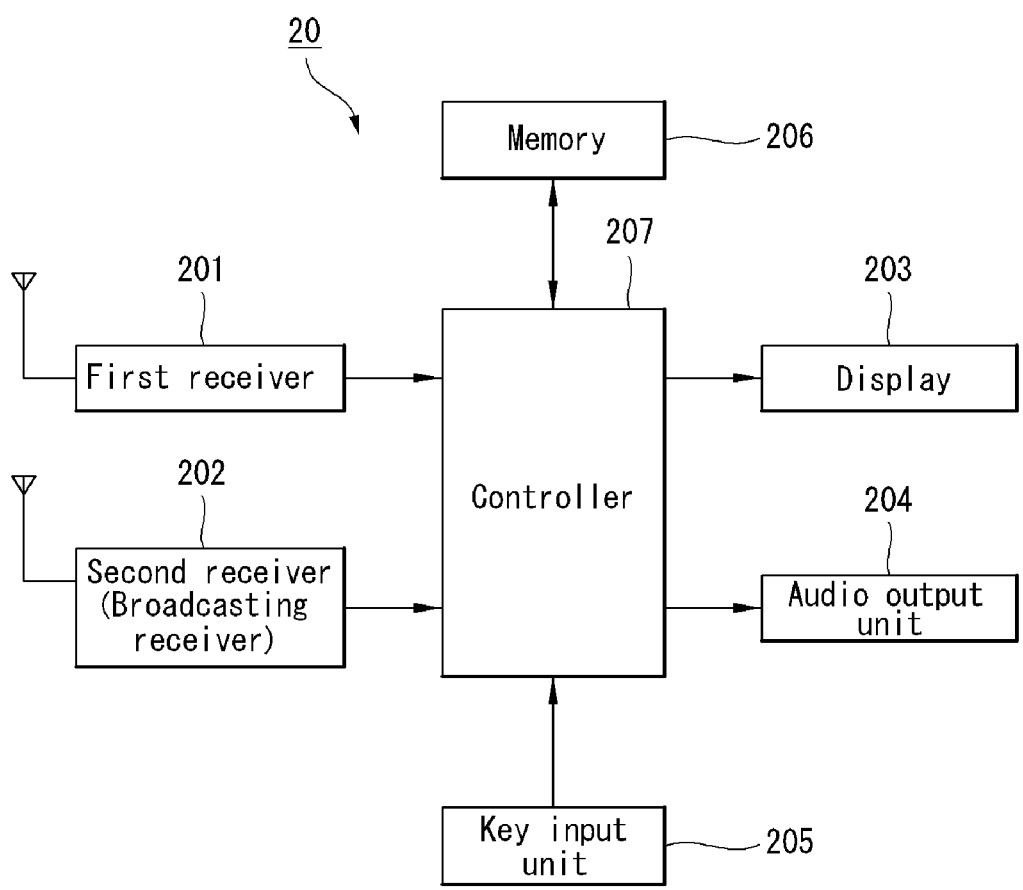
FIG. 4 is a block diagram of a display device of FIG. 1.

FIG. 4 is a block diagram of a display device of FIG. 1. With reference to FIG. 4, a display device according to one embodiment of the present invention will now be described.

A display device 20 comprises a first receiver 201, a second receiver 202, a display 203, an audio output unit 204, a key input unit 205, a memory 206, and a controller 207.

A first receiver 201 receives a signal from a 3D pointing device 10. The first receiver 201 and the 3D pointing device 10 can communicate with each other through RF communication.

The second receiver 202 receives a broadcasting signal from a broadcasting station 30. The broadcasting signal can comprise at least one of an audio signal and a video signal. Also, the broadcasting signal can comprise data broadcasting including text information.

The display 203 displays video information by using a control signal output from the controller 207. For example, the video information can correspond to a video signal included in a broadcasting signal received through the second receiver 202, various graphic user interfaces (GUIs) provided by the display device 20, or information displaying the status of the display device 20.

The audio output unit 204 is a device for outputting audio information. The audio output unit 204 can comprise a speaker.

The key input unit 205 is a device for receiving a variety of information or commands from the user. For example, the key input unit 205 can be equipped in the front or in the side surface of the display device 20.

The memory 206 stores a predetermined program for controlling the overall operation of a display device 20. Input/output data and various kinds of data processed can be stored temporarily or permanently when the overall operation of the display device 20 is carried out by the controller 207.

The display device 20, in addition to the constituting components described above, can be equipped with a device able to connect to the Internet 40 and an A/V decoding means able to decode A/V signals received from the Internet 40. The A/V decoding means can be a software processing means or a hardware processing means such as a separate multimedia chip.

The controller 207 controls constituting components and supervises the overall operation of the display device 20 according to embodiments of the present invention.

In the present invention, the display device 20 performs a function by receiving a signal from the 3D pointing device 10. A variety of information is carried by the signal transmitted to the display device 20 from the 3D pointing device 10. For example, the 3D pointing device 10 can transmit information itself about 3D motion to the display device 20. At this time, the display device 20 processes the information about 3D motion of the 3D pointing device 10 and performs a dedicated function provided by the display device 20. In addition, the 3D pointing device can process 3D motion thereof and then transmit information about a command for carrying out a function provided by the display device 20. At this time, the display device 10 does not receive information itself about 3D motion of the 3D pointing device. Furthermore, the 3D pointing device 10 can transmit information about 3D motion thereof and partially processed information about the 3D motion to the display device 20. At this time, the display device 10 can process the remaining information required for performing embodiments of the present invention.

Figure 5:
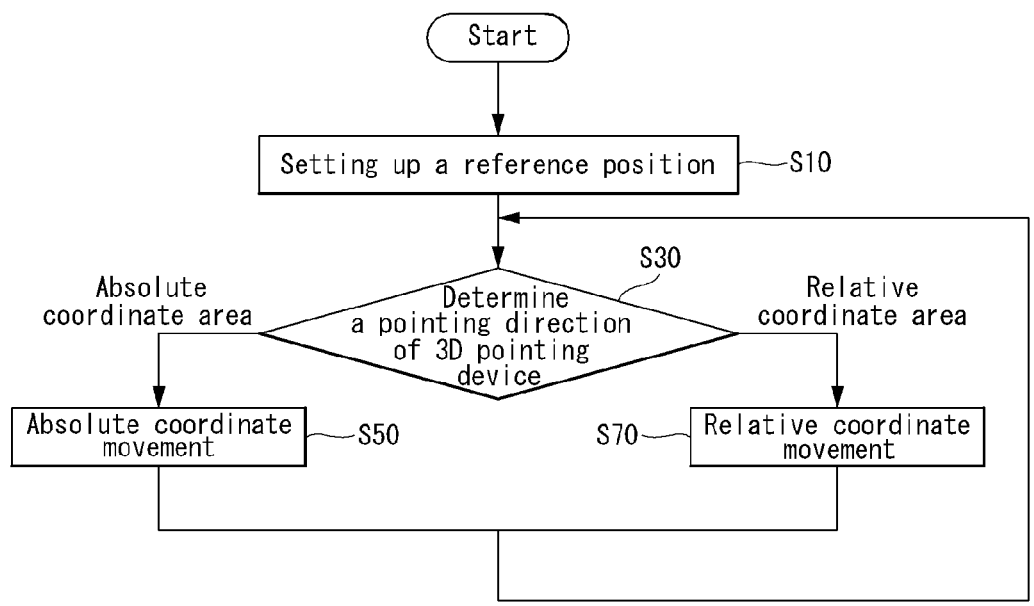
FIG. 5 is a flow chart illustrating operation of a display device according to one embodiment of the present invention.
Figure 6:
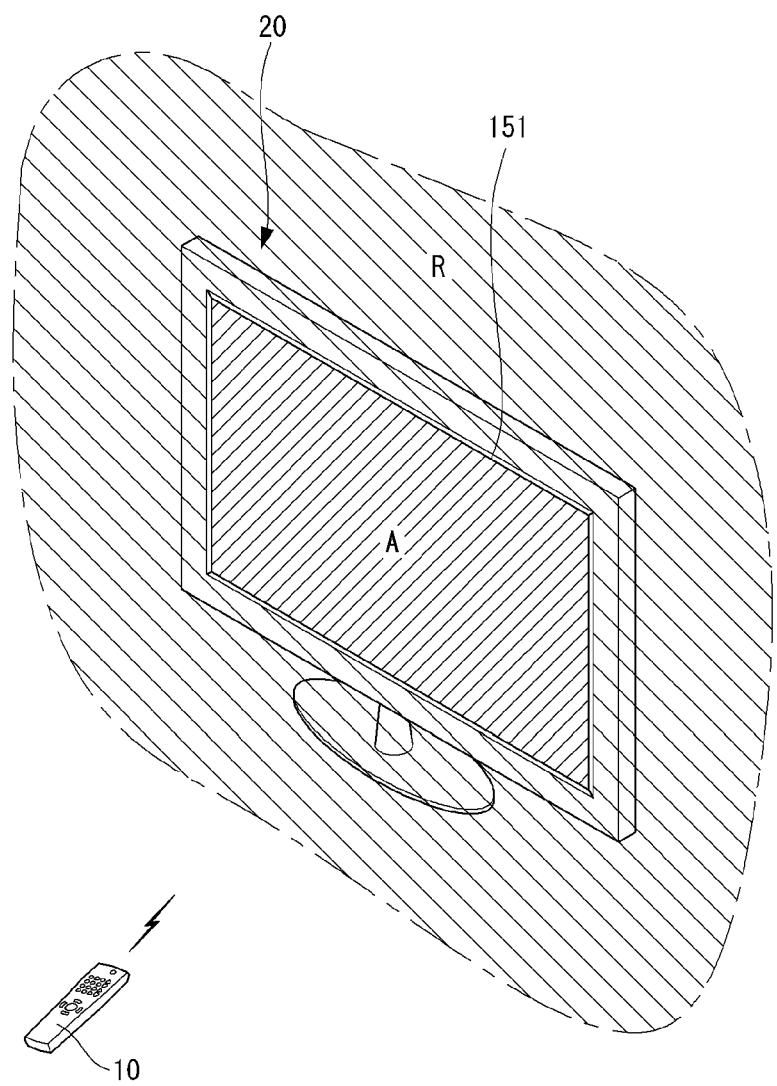
FIG. 6 illustrates an absolute coordinate area and a relative coordinate area of a display device of FIG. 5.

FIG. 5 is a flow chart illustrating operation of a display device according to one embodiment of the present invention; FIG. 6 illustrates an absolute coordinate area and a relative coordinate area of a display device of FIG. 5.

As shown in the figures, a display device 10 according to one embodiment of the present invention can comprise setting up a reference position S10.

A reference position can correspond to the origin of an absolute coordinate area A or an absolution reference point (0 of FIG. 8) in the absolute coordinate area. In other words, the absolute reference point (0 of FIG. 8) indicates a reference point in the absolute coordinate area A corresponding to the inside area of the display unit 151.

Figure 7:
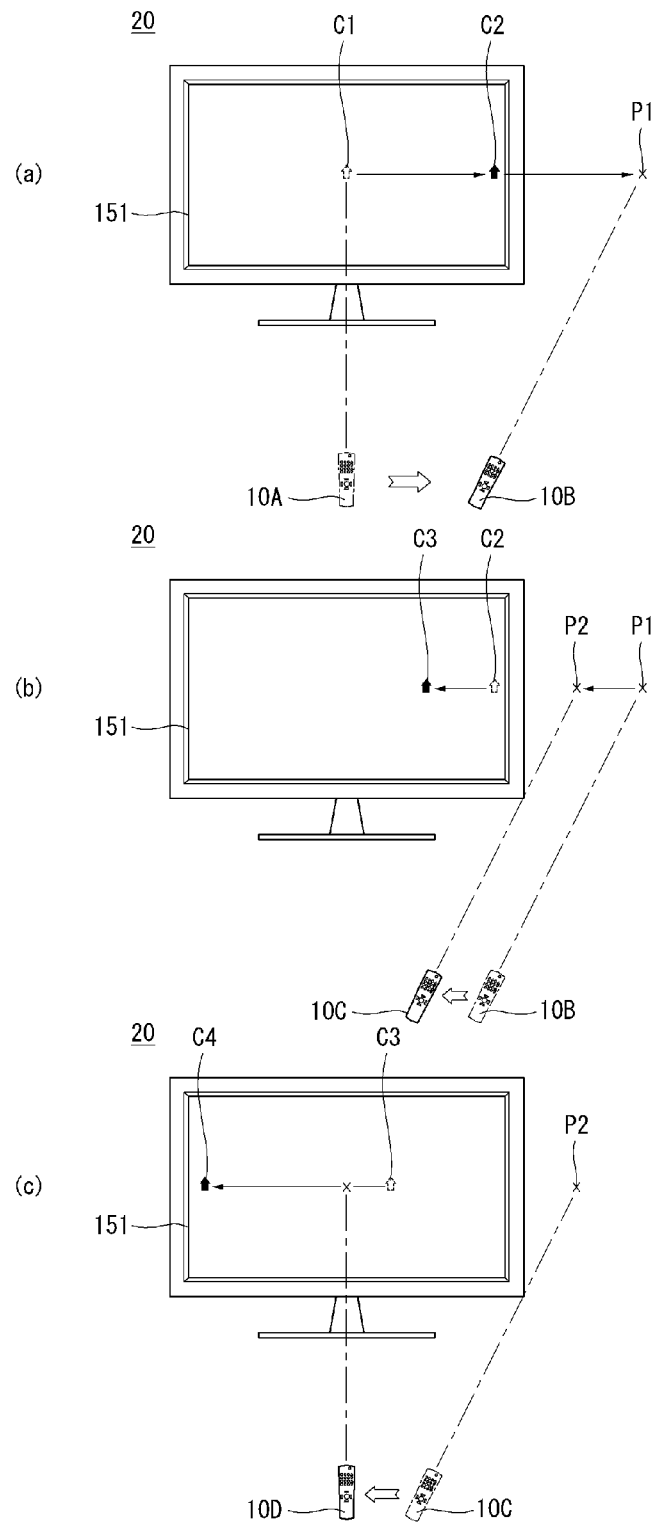
FIG. 7 illustrates a cursor moving with respect to relative coordinates only.
Figure 8:
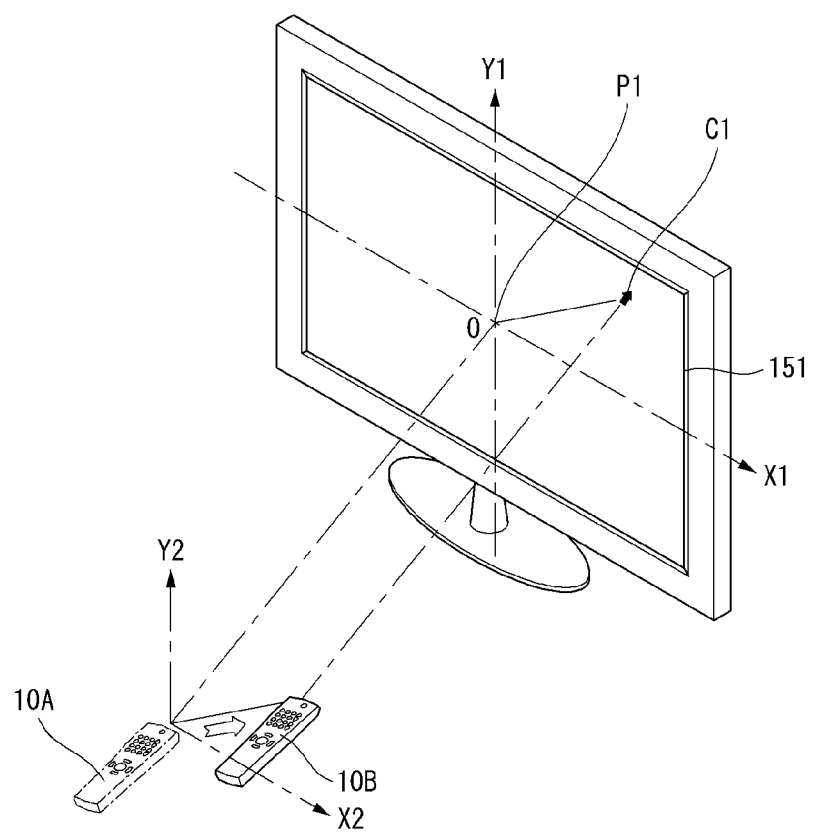
FIGS. 8 and 9 illustrate a cursor moving in an absolute coordinate area.

The absolute coordinate area A corresponds to an area where an object moves with respect to the predetermined absolute reference point (0 of FIG. 8). In other words, movement of an object displayed in the display unit 151 corresponds to the movement with respect to the origin which is a particular reference point. An object in this sense refers to various displays displayed on the display unit 151, which can be controlled by the user of the display device 20. For example, the object can correspond to a cursor (C1 of FIG. 7); a selection button of a menu window; or an arm, a leg, or a trunk of a character displayed on the display unit 151.

A relative coordinate area R corresponds to an area where an object moves based on relative positions. In other words, movement of an object displayed on the display unit 151 relies on the position of the object displayed previously on the display unit 151.

Movements of an object in the absolute coordinate area A and in the relative coordinate area R may show different behaviors from each other. For example, the movement of the 3D pointing device 10 made by the user in the absolute coordinate area A can show one-to-one correspondence between each other. In other words, if the 3D pointing device 10 moves from a (x1, y1) position to a (x2, y2) position in the space, an object corresponding to the 3D pointing device 10 moves from a (x3, y3) position to a (x4, y4) position. The distance between (x1, y1) and (x2, y2) and that between (x3, y3) and (x4, y4) can be different from each other according to a matching ratio. Also, the scope and the position of the absolute coordinate area A can be determined by the user.

In the relative coordinate area R, if the 3D pointing device 10 moves from a first position to a second position, an object corresponding to the 3D pointing device 10 moves in proportion to the distance and the direction between the first and the second position. In other words, the behavior of an object in the relative coordinate area R is different from that in the absolute coordinate area A in a sense that coordinates in the relative coordinate area R are not calculated with respect to a particular reference point. To be described more specifically below, since coordinates are not calculated with respect to a particular reference point in the relative coordinate area R, a direction pointed by the user with the 3D pointing device 10 may not coincide with the position at which an object is displayed on the display unit 151. In the display device 20 according to one embodiment of the present invention, since the position and the movement of an object in the absolute coordinate area A can coincide with a pointing direction of the 3D pointing device 10, the user can easily manipulate the 3D pointing device 10 according to the user's intuition.

A reference position can be determined by the user. Although it will be described in detail later, the reference position can be determined when the user uses the display device 20 for the first time or when the user selects a function for setting up a reference position.

Determining a pointing direction of the 3D pointing device 10 can be carried out S30.

A pointing direction refers to a direction in which the user points with the 3D pointing device 10. In a normal situation, the user grabs the body of the 3D pointing device 10 and makes the front surface of the 3D pointing device 10 face the display device 20. Therefore, a pointing direction is commonly determined by a point where a virtual line extended in the longitudinal direction of the 3D pointing device 10 meets the flat surface formed by the display unit 151. Once the pointing direction is determined, it can be determined whether the point belongs to the absolute coordinate area A or the relative coordinate area R.

If the pointing direction leads to the absolute coordinate area A, an absolute coordinate movement is carried out S50, whereas if the pointing direction leads to the relative coordinate area R, a relative coordinate movement is carried out S70.

As described above, the absolute coordinate movement indicates that a movement of an object is calculated with respect to an absolute reference point (0 of FIG. 8); on the other hand, the relative coordinate movement indicates that a movement of the object is calculated based on the difference between relative positions.

FIG. 7 illustrates a cursor moving with respect to relative coordinates only.

As shown in the figure, if only relative coordinates are taken into consideration, movement of a cursor C1 may not conform to the user's intuition.

As shown in FIG. 7(a), the user can position the 3D pointing device 10 from a first device position 10A to a second device position 10B. As the 3D pointing device 10 is moved from the first device position 10A to the second device position 10B, the corresponding pointing direction of the 3D pointing device 10 can be changed. If the pointing direction of the 3D pointing device 10 is changed, the position of the cursor C1, C2, which is the corresponding object displayed on the display unit 151, can be changed. In other words, at the first device position 10A, a first cursor position C1 becomes the corresponding pointing direction and the cursor can be displayed at that position. If the user moves the 3D pointing device 10 to the second device position 10B, the cursor can track the movement of the 3D pointing device 10 up to a second cursor position C2. If the 3D pointing device 10 gets out of the area of the display unit 151, however, the cursor may fail to track the movement of the 3D pointing device 10 and stay at the second cursor position C2. Therefore, a current position at which the cursor is displayed and a first pointing position P1 of the 3D pointing device 10 may differ.

As shown in FIG. 7(b), the user can move the 3D pointing device 10 from the second device position 10B to a third device position 10C to make the 3D pointing device 10 direct from the first pointing position P1 to a second pointing position P2. If the user moves the 3D pointing device 10 from the second device position 10B to the third device position 10C, the corresponding pointing direction of the 3D pointing device 10 can change from the first pointing position P1 to the second pointing position P2. At this time, if the cursor is moved by taking account of relative coordinates, the cursor can be displayed to move from the second cursor position C2 to a third cursor position C3.

As shown in FIG. 7(c), the user can move the 3D pointing device 10 from the third device position 10C to a fourth device position 10D. If the user moves the 3D pointing device 10 from the third device position 10C to the fourth device position 10D, the cursor can be displayed to move from the third cursor position C3 to a fourth cursor position C4 to reflect the corresponding movement by taking account of relative coordinates thereof. As a result, although the user points the 3D pointing device 10 to direct towards the center of the display unit 151, the cursor may stay at a different position of the display unit 151 failing to track the pointing movement. Therefore, the user using the 3D pointing device 10 may get confused from the mismatch.

Figure 9:
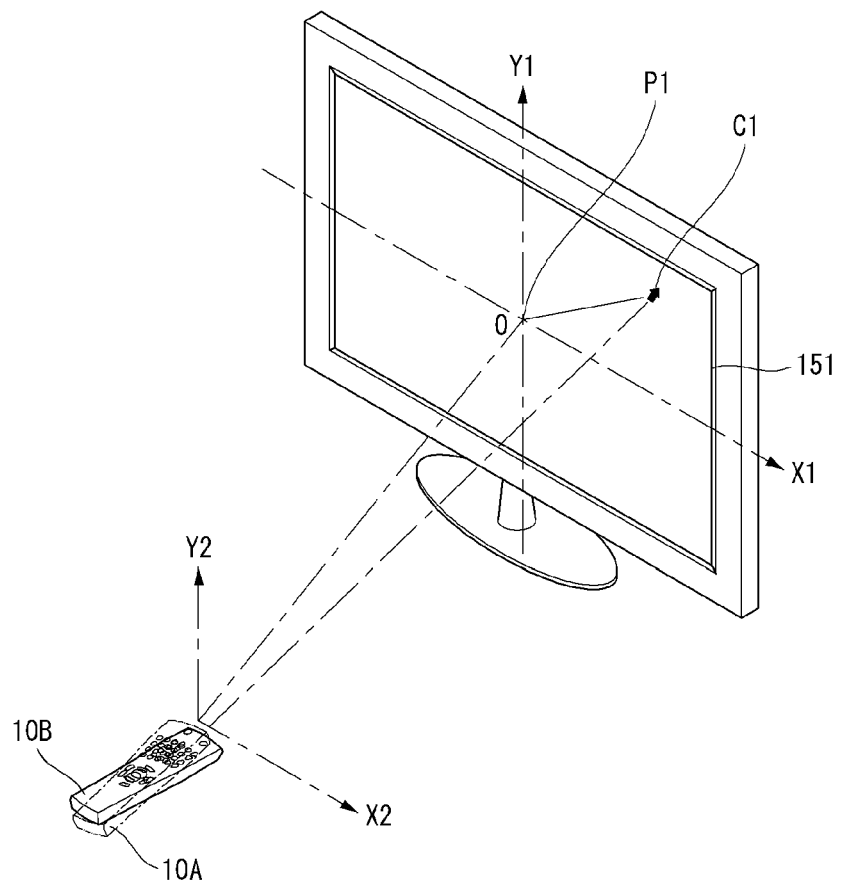

FIGS. 8 and 9 illustrate a cursor moving in an absolute coordinate area.

As shown in the figures, a cursor can be moved with respect to a particular absolute reference point (0) when absolute coordinates are taken into account.

As shown in FIG. 8, the user can move the 3D pointing device 10 from the first device position 10A to the second device position 10B. In this case, even though a rotational force is not applied to the 3D pointing device 10, a three dimensional movement of the 3D pointing device 10 can be sensed by using the accelerometer (107 of FIG. 3) and a gyro sensor 108.

If the 3D pointing device 10 is positioned at the first device position 10A, a pointing direction of the 3D pointing device 10 may point to the absolute reference point (0) of the display unit 151. The absolute reference point (0) can correspond to the center of the display unit 151 and a virtual first coordinate (X1-Y1) may be set up with respect to the absolute reference point (0).

Even if the 3D pointing device 10 points to the absolute reference point (0), a second coordinate (X2-Y2) corresponding to the first coordinate (X1-Y1) can be set up with respect to the 3D pointing device 10. The first coordinate (X1-Y1) and the second coordinate (X2-Y2) can be matched to each other.

If the 3D pointing device 10 moves from the first device position 10A to the second device position 10B, the cursor can move from a first position P1 to the first cursor position C1 to correspond to the movement. The first cursor position C1 can be calculated with respect to the absolute reference point 0. In other words, if the controller (207 of FIG. 4) senses a position change of the 3D pointing device 10 from a wireless signal received from the 3D pointing device 10, the controller (207 of FIG. 4) can calculate how large the position change is from the absolute reference point (0) and in which direction the position change is made. After a direction and a distance are calculated with respect to the absolute reference point (0), the controller (207 of FIG. 4) converts the two values into the corresponding absolute coordinate values and displays the cursor at the first cursor position C1. At this time, the cursor can be displayed to move continuously for an interval from the first position P1 to the first cursor position C1.

Since the cursor moves with respect to the absolute reference point (0), a pointing direction of the 3D pointing device and a display position of the cursor can correspond to each other within the absolute coordinate area. Therefore, the cursor can be displayed at a position estimated by the user's intuition as the user moves the 3D pointing device 10.

As shown in FIG. 9, the user can rotate the 3D pointing device 10 from the first device position 10A to the second device position 10B. In this case, by using each of the geomagnetic sensor (106 of FIG. 3), the accelerometer 107, and the gyro sensor 108 or by using a combination thereof, a pointing direction of the 3D pointing device 10 can be sensed. In other words, since azimuth angle at which the 3D pointing device 10 is directed can be changed even if the 3D pointing device 10 rotates around Y2 axis without a position change, sensing values obtained through the geomagnetic sensor (106 of FIG. 3) and the gyro sensor 108 can be changed accordingly. Therefore, even if the 3D pointing device 10 makes a proper rotation, the cursor can be displayed at the first cursor position C1 corresponding to a pointing position by sensing the pointing position of the 3D pointing device 10.

Figure 10:
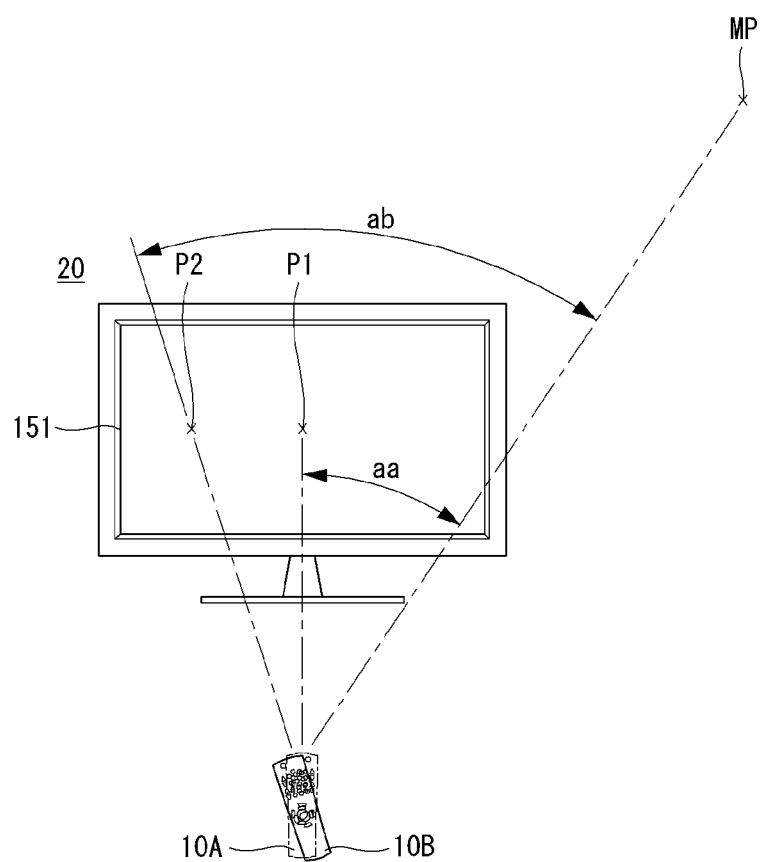
FIG. 10 illustrates operation of a sensor unit.

FIG. 10 illustrates operation of a sensor unit.

The display device 20 according to one embodiment of the present invention can know the position of the 3D pointing device 10 by receiving a wireless signal transmitted from the 3D pointing device 10. As described above, the 3D pointing device 10 can comprise a geomagnetic sensor (106 of FIG. 3), an accelerometer (107 of FIG. 3), a gyro sensor (108 of FIG. 3), and a range finding sensor (109 of FIG. 3). The geomagnetic sensor (106 of FIG. 3) and the accelerometer (107 of FIG. 3) can be used for basic data to determine the position of the 3D pointing device 10 in the absolute coordinate area; the gyro sensor (108 of FIG. 3) can be used for basic data to determine the position of the 3D pointing device 10 in the relative coordinate area.

When the 3D pointing device 10 moves from the first device position 10A to the second device position 10B, the first position P1 corresponding to the first device position 10A can be one position of the display unit 151; a second position P2 corresponding to the second device position 10B can be another position of the display unit 151.

While the 3D pointing device 10 moves in the absolute coordinate area, the position of the 3D pointing device 10 can be determined by using the gyro sensor (106 of FIG. 3) included in the 3D pointing device 10. The geomagnetic sensor (106 of FIG. 3) can determine the position of the magnetic north (MP) formed by magnetic field of the earth. Therefore, it can be known that due to the movement of the 3D pointing device 10, the first position P1 is at a position moved by an angle of aa degrees and the second position P2 by an angle of ab degrees. Therefore, the controller (107 of FIG. 4)

of the display device 20 can determine to which point in the absolute coordinate area the 3D pointing device 10 is directed. Also, if the first position P1 is the absolute coordinate point, it can be known that the second position P2 has been moved to the left by an angle of ab-aa degrees with respect to the first position P1 by using the geomagnetic sensor (106 of FIG. 3). Angle data obtained from the geomagnetic sensor (106 of FIG. 3) can be transmitted to the display device 20 after being processed at the 3D pointing device 10; or the obtained angle data is transmitted directly to the display device 20 and processed by the controller (207 of FIG. 4) of the display device 20.

Figure 11:
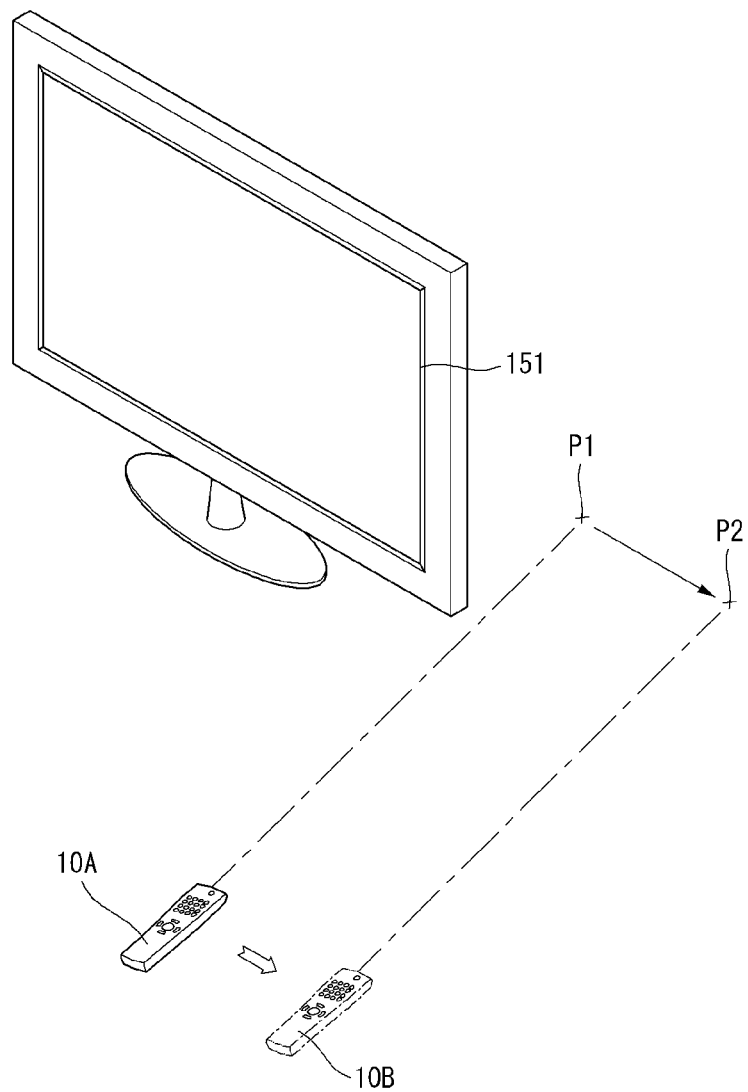
FIG. 11 illustrates a cursor moving in a relative coordinate area.

FIG. 11 illustrates a cursor moving in a relative coordinate area.

As shown in the figure, the movement of the 3D pointing device 10 in the relative coordinate area can be determined based on relative positions of the respective points comprising the trajectory of the 3D pointing device 10.

In case of moving from the first device position 10A to the second device position 10B, the gyro sensor (108 of FIG. 4) included in the 3D pointing device 10 can detect the movement. However, the movement can be relative position data indicating a movement from the first position P1 corresponding to the first device position 10A to the second position P2 corresponding to the second device position 10B.

Figure 12:
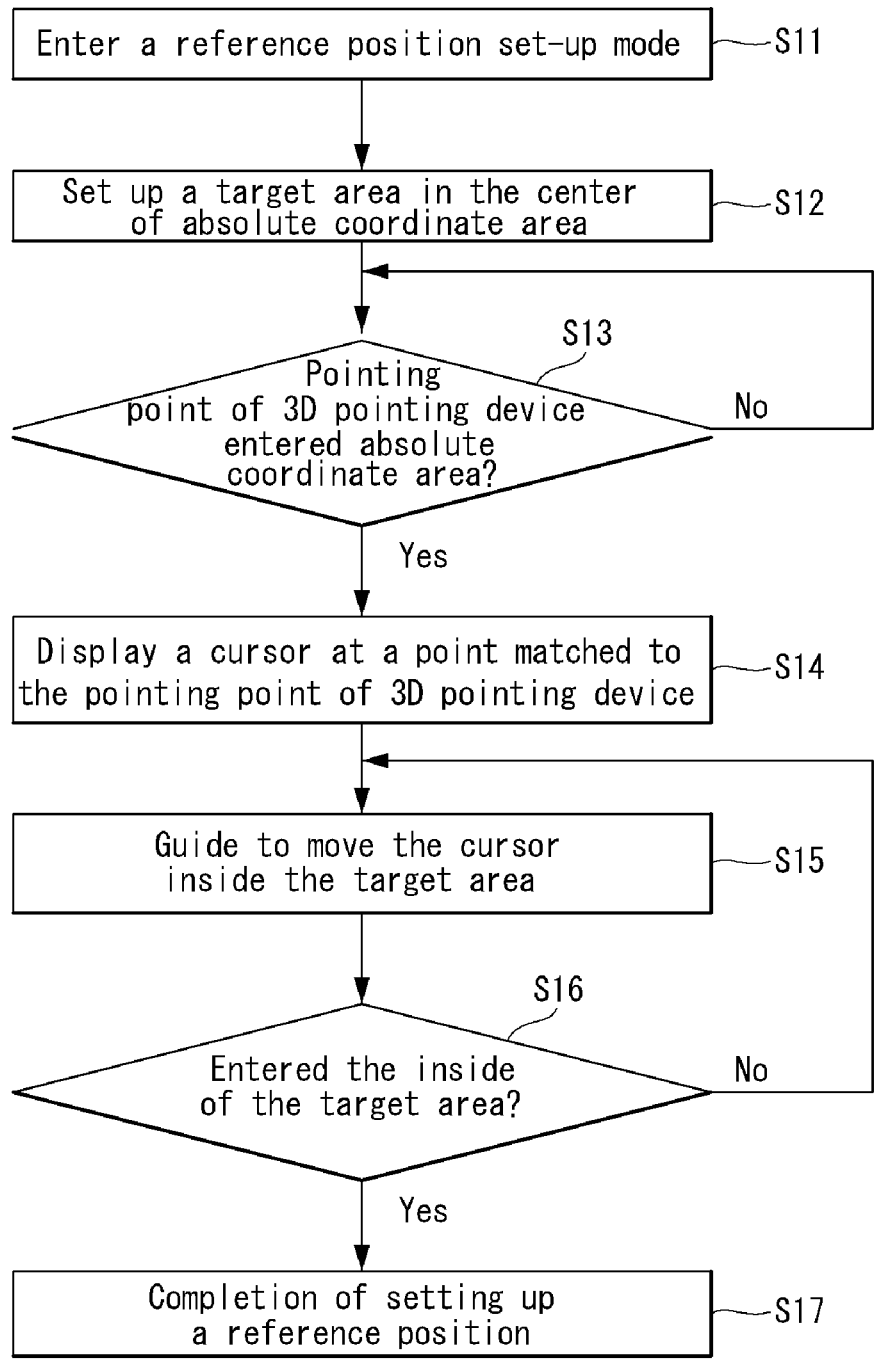
FIG. 12 illustrates setting up a reference position of FIG. 5 more specifically.
Figure 13:
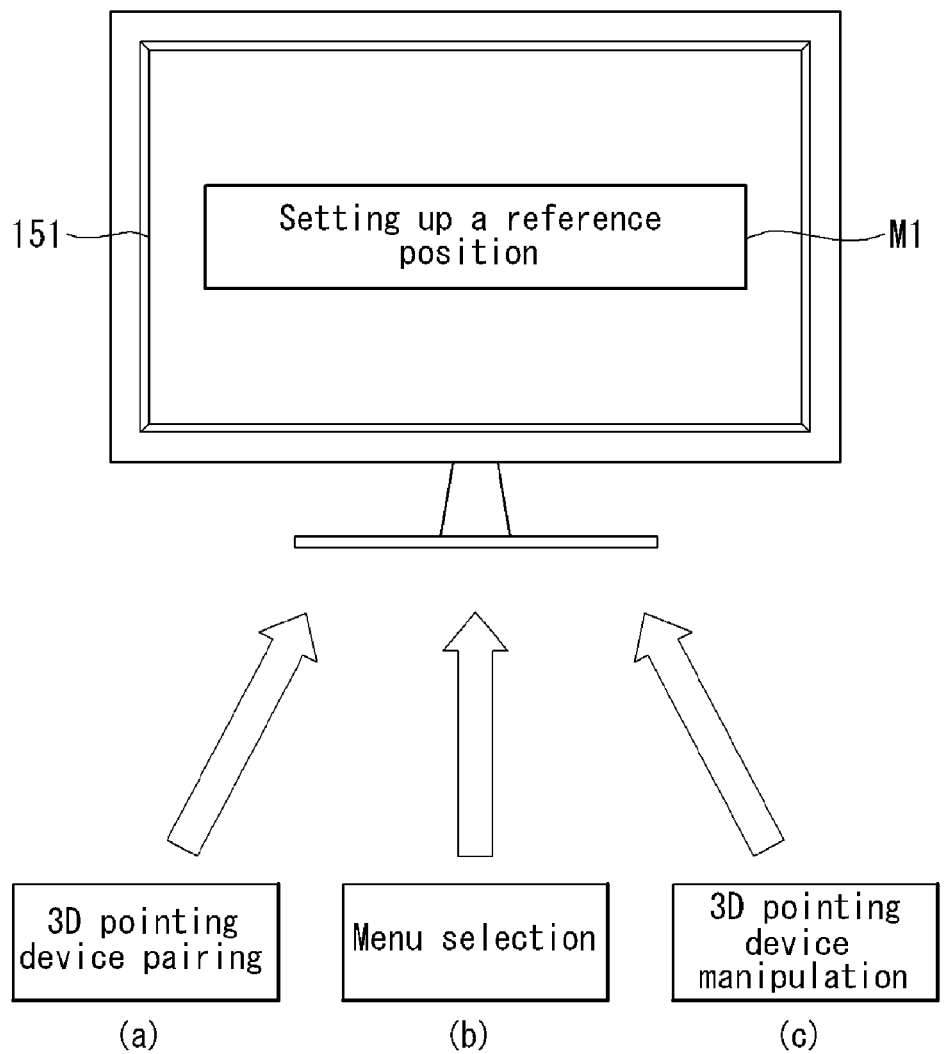
FIG. 13 illustrates a procedure for entering a reference position set-up mode of FIG. 12.
Figure 14:
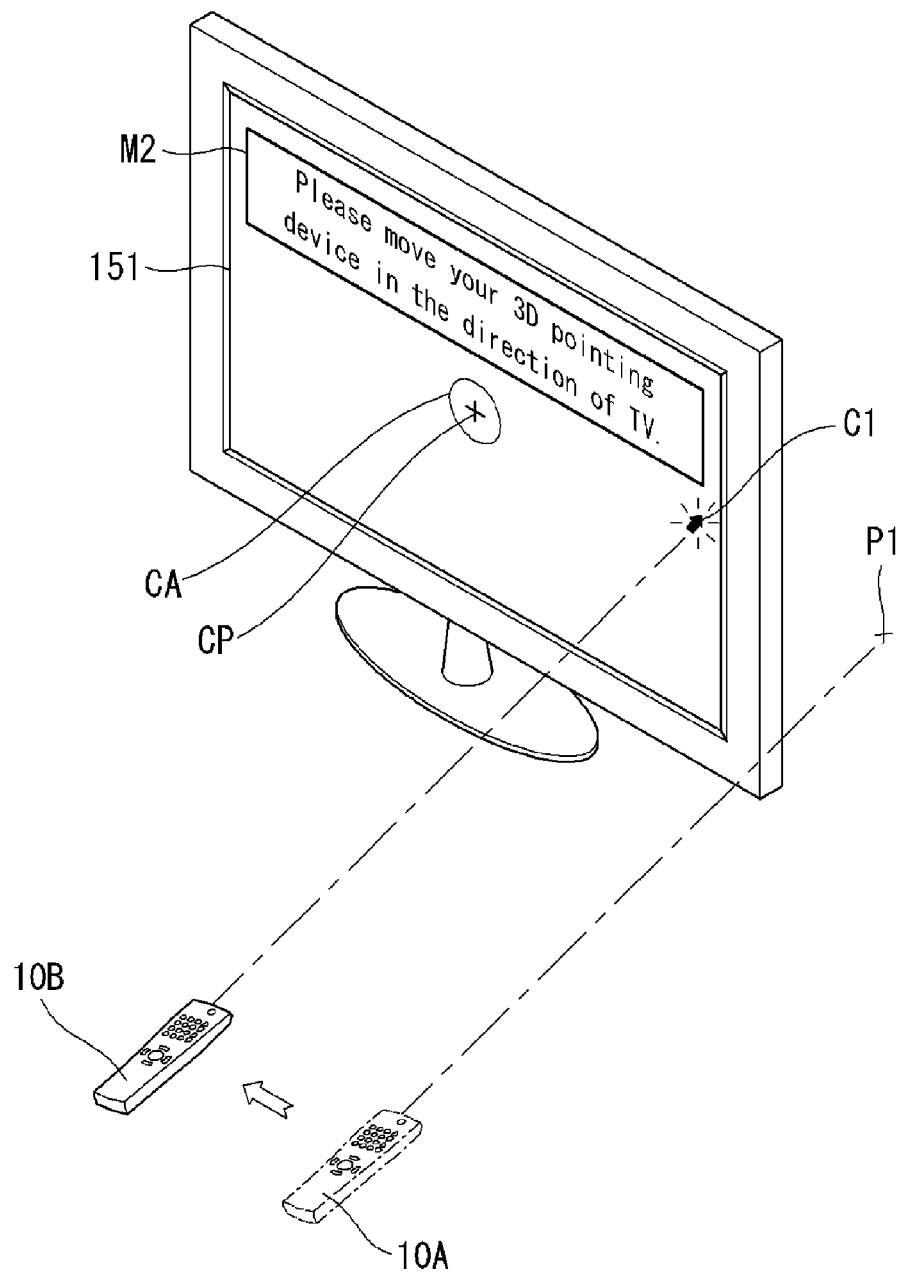
FIGS. 14 to 16 illustrate one procedure for setting up a reference position.
Figure 15:
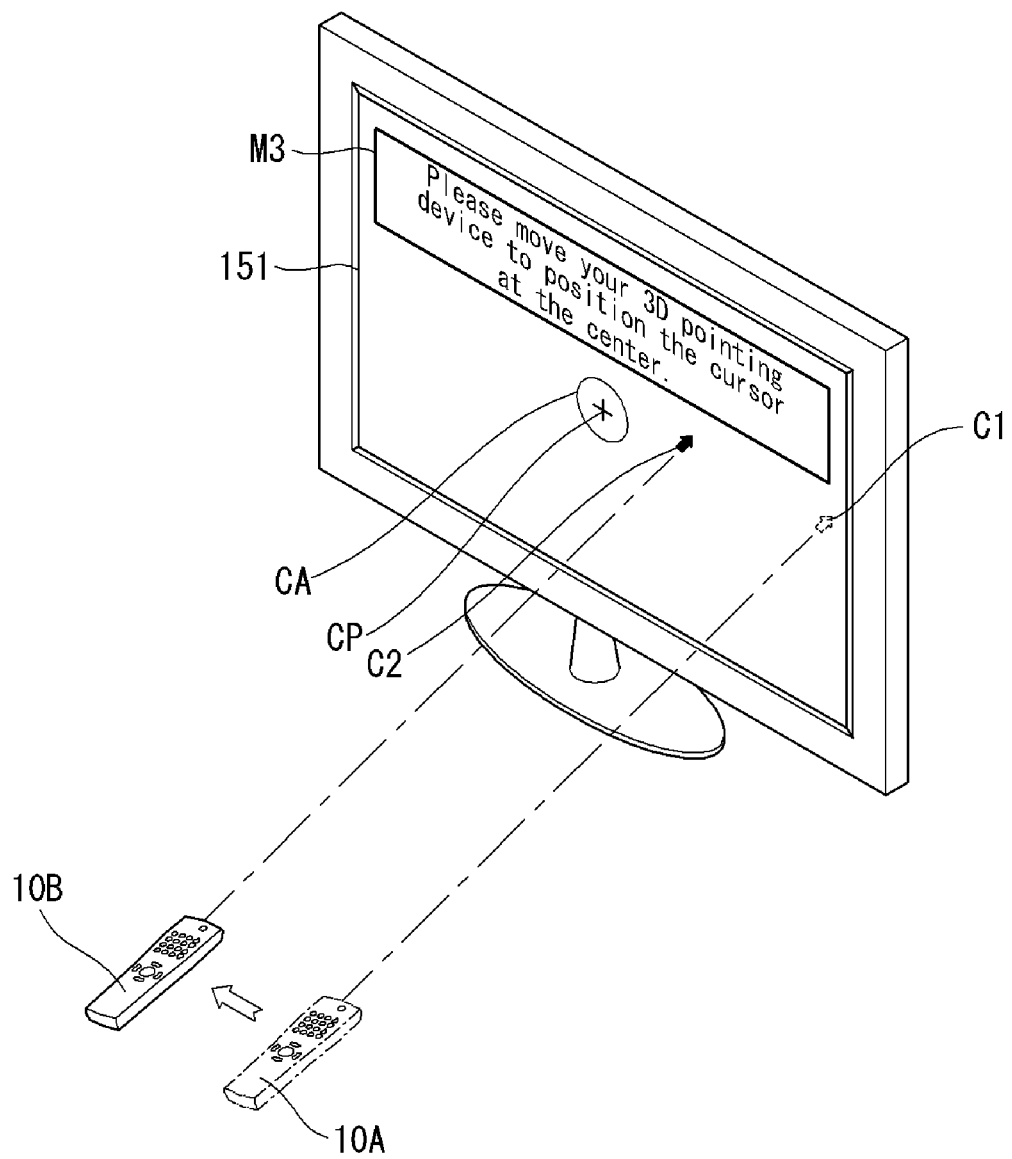
Figure 16:
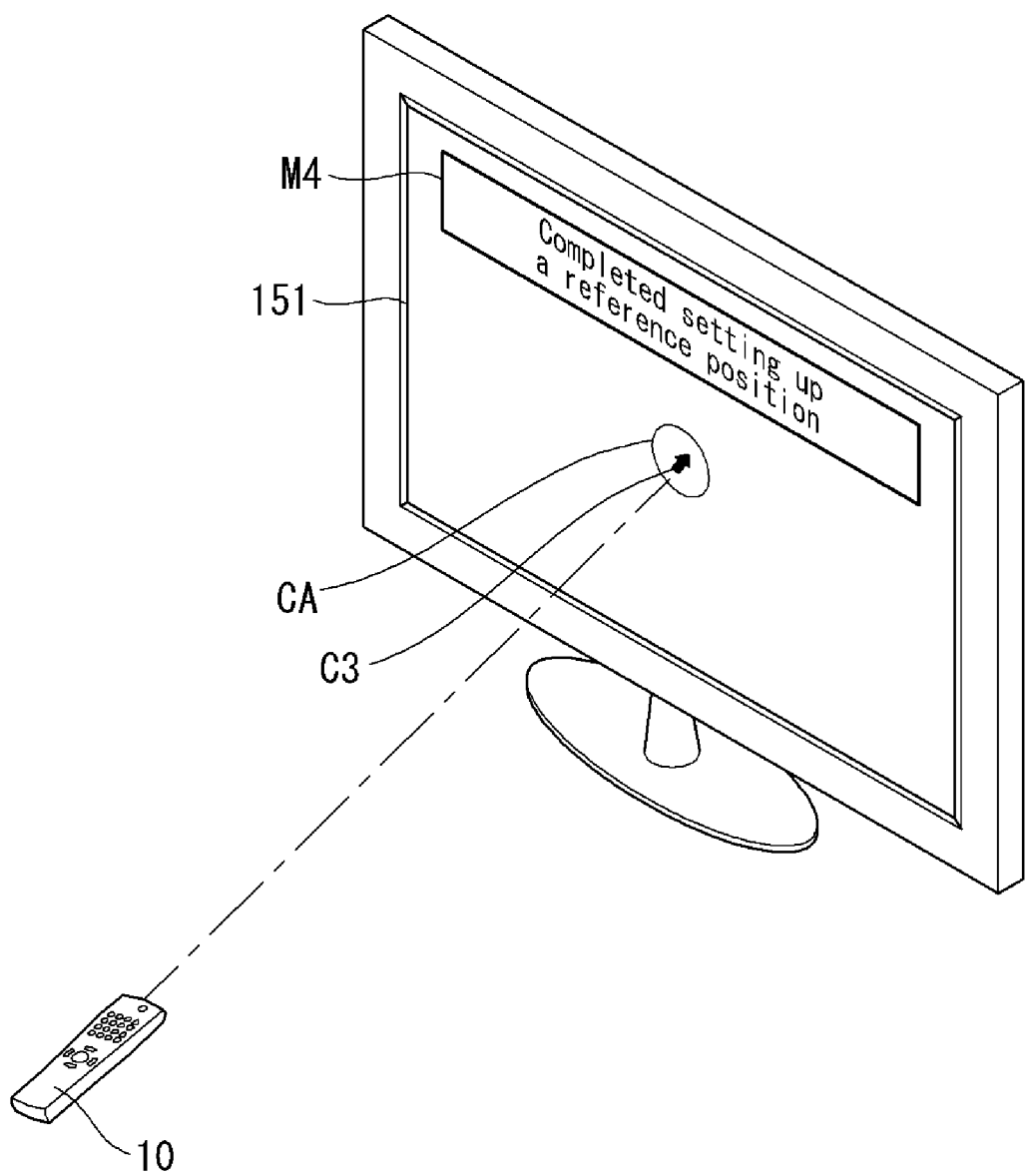

FIG. 12 illustrates setting up a reference position of FIG. 5 more specifically. FIG. 13 illustrates a procedure for entering a reference position set-up mode of FIG. 12. FIGS. 14 to 16 illustrate one procedure for setting up a reference position.

As shown in the figures, setting up a reference position (10 of FIG. 5) of the display device 20 according to one embodiment of the present invention can include entering a mode for setting up a reference position S11.

The mode for setting up a reference position can be initiated in various cases. In other words, as shown in FIG. 13, the mode can be initiated by pairing up the 3D pointing device 10, by the user's selecting a menu to enter the mode for setting up a reference position, or by manipulating the 3D pointing device 10. At this time, the display unit 151 can display a first pop-up window M1 informing the user of the initiation of the mode.

Pairing up the 3D pointing device 10 can indicate a process of making the 3D pointing device 10 and the display device 20 recognize each other for communication between them. For example, if the user uses the display device 20 for the first time, by pairing up the 3D pointing device 10 with the display device 20, the display device 20 can be operated by using the 3D pointing device 10.

After entering the mode for setting up a reference position, setting up a target area CA in the center of the absolute coordinate area S12 can be carried out.

The target area CA is a predetermined area in the center of the absolute coordinate area. The target area CA can be displayed for the user to recognize a reference position easily.

Whether a point pointed by the 3D pointing device 10 has moved inside the absolute coordinate area is checked S13. If the point is found to belong to the absolute coordinate area, displaying a cursor at a matched position pointed by the 3D pointing device 10 can be carried out S14.

As shown in FIG. 14, the display unit 151 can display a second pop-up window M2 displaying a guide for the user to take particular actions. Also, if the user moves the 3D pointing device 10 inside the display unit 151, which corresponds to the absolute coordinate area, according to the guide, the cursor can be displayed at the pointing point.

As shown in FIG. 15, the display unit 151 can display a third pop-up window M3 displaying a guide guiding the user to move the cursor inside the target area CA. The user, according to the guide, moves the 3D pointing device 10, thereby moving the cursor from the first cursor position C1 to the second cursor position C2.

Determining S16 whether the cursor has moved inside the target area CA and completing setting up a reference position S17 can be carried out.

As shown in FIG. 16, the user can make the cursor positioned inside the target area CA by moving the 3D pointing device 10. If the cursor is moved inside the target area CA, the controller (207 of FIG. 4) sets the current position of the cursor as the reference position and can complete the setting up a reference position.

By carrying out a process of setting up a reference position of the absolute coordinate area, the user can more clearly recognize at which point of the display unit 151 the absolute coordinate system is placed. Furthermore, the reference position of the absolute coordinate area can be set up again during use; therefore, if the reference position is displaced, the displacement can be corrected properly.

Figure 17:
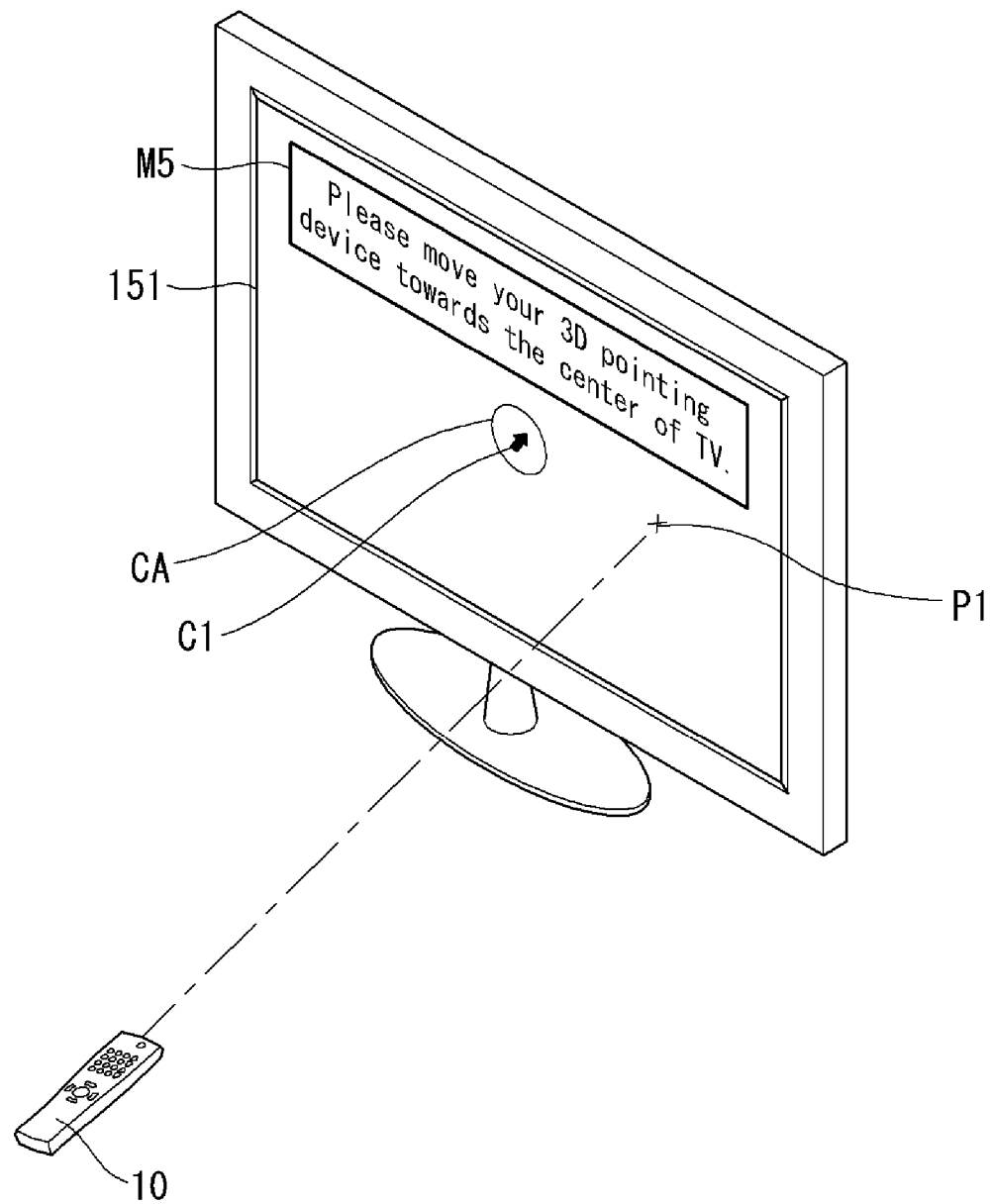
FIGS. 17 and 18 illustrate another procedure for setting up a reference position.
Figure 18:
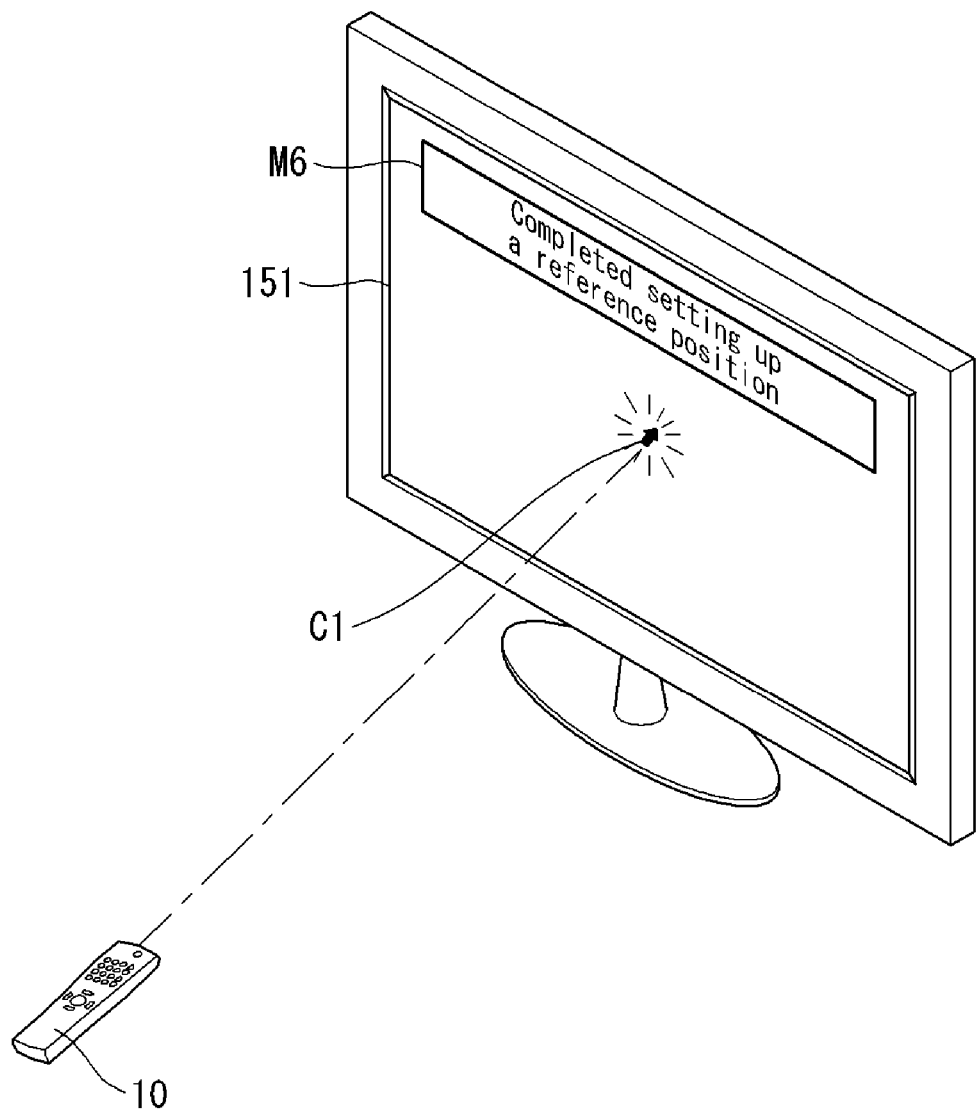

FIGS. 17 and 18 illustrate another procedure for setting up a reference position.

As shown in the figures, setting up a reference position can be carried out in various ways.

As shown in FIG. 17, the display unit 151 may not display a cursor at a pointing point P1 corresponding to the movement of the 3D pointing device 10. Instead, the cursor C1 is displayed inside the target area CA and displayed is a fifth pop-up window M5 guiding the user to make the 3D pointing device 10 direct towards the cursor C1 position displayed.

As shown in FIG. 18, if the user positions the 3D pointing device 10 to direct towards the cursor C1 displayed, a sixth pop-up window M6 indicating completion of the setting up a reference position can be displayed. At the same time, the displayed cursor C1 can be activated. If the displayed cursor C1 is activated, the displayed cursor C1 can be moved from that moment by using the 3D pointing device 10.

Figure 19:
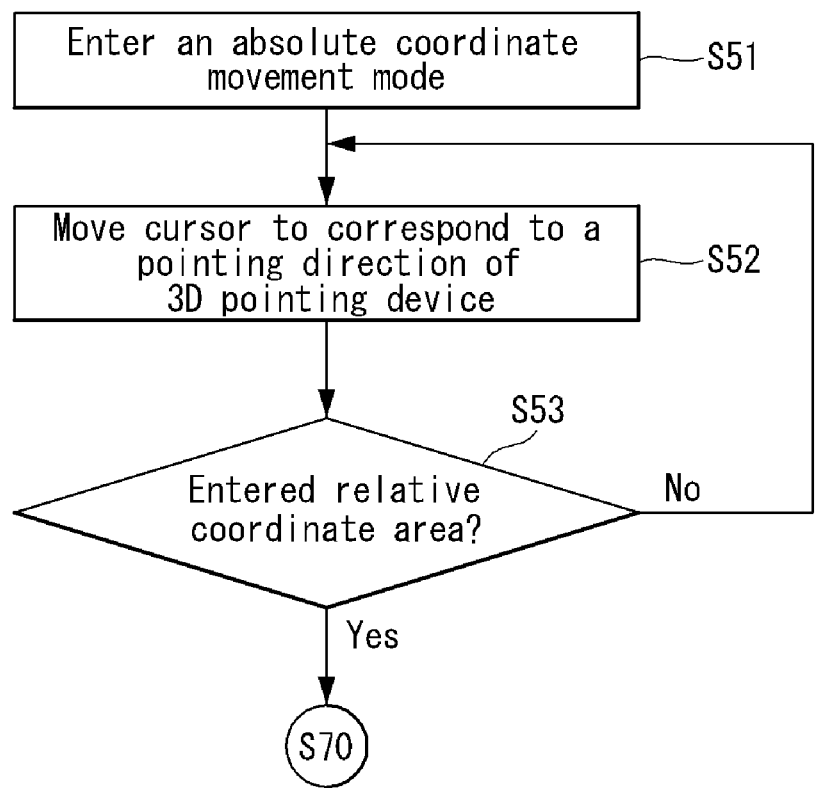
FIG. 19 illustrates an absolute coordinate movement of FIG. 5.
Figure 20:
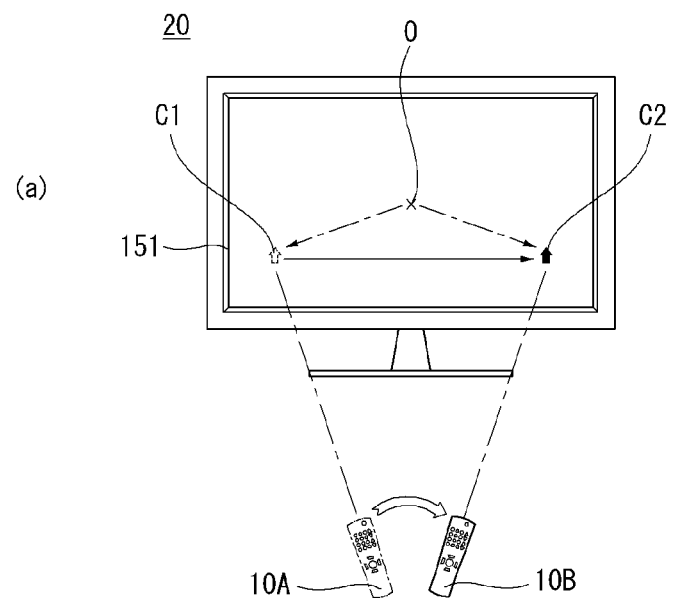
FIGS. 20 and 21 illustrate movement of a cursor according to the absolute coordinate movement of FIG. 19.
Figure 20:
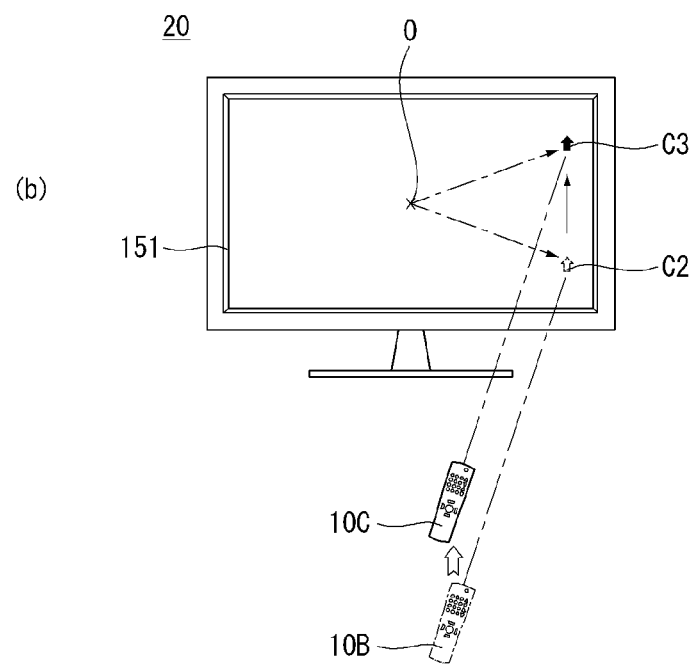
Figure 21:
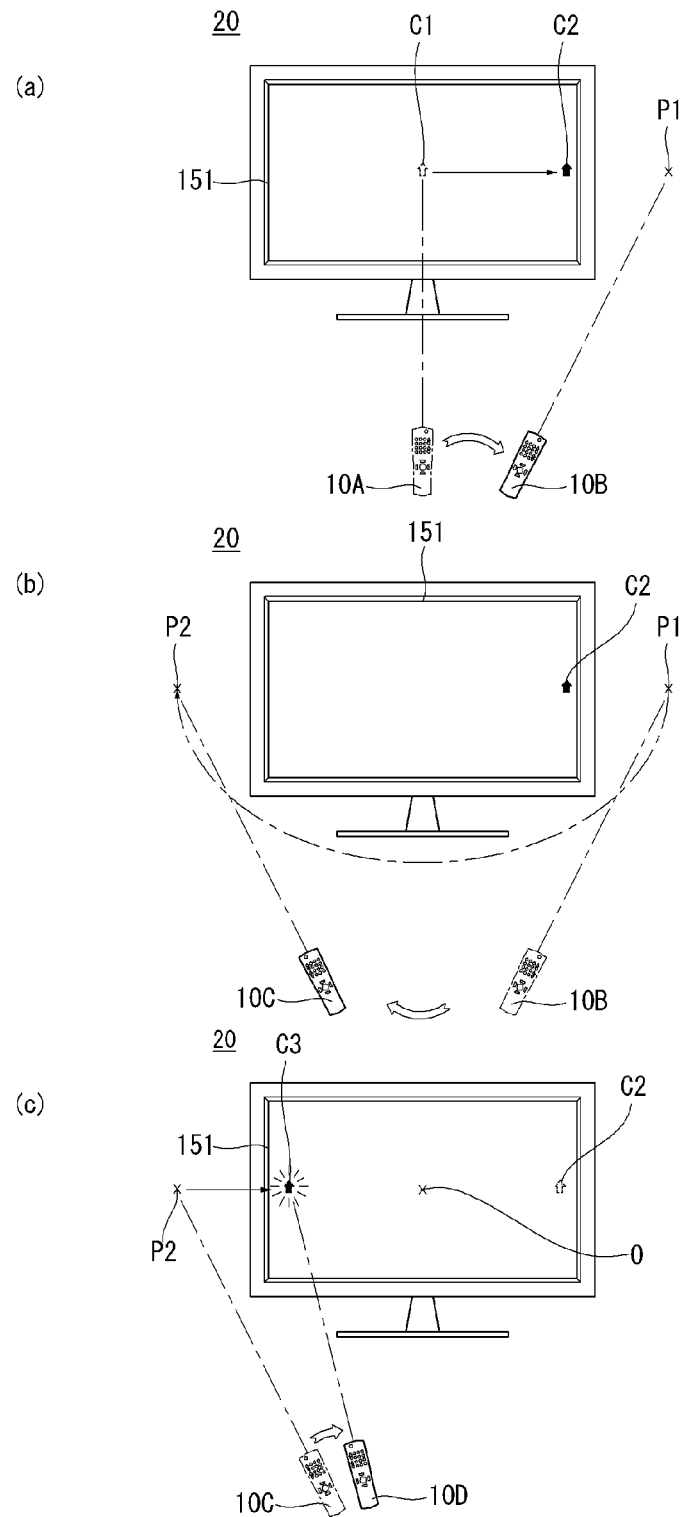

FIG. 19 illustrates an absolute coordinate movement of FIG. 5; FIGS. 20 and 21 illustrate movement of a cursor according to the absolute coordinate movement of FIG. 19.

As shown in the figures, moving an absolute coordinate S50 in the display device 20 according to one embodiment of the present invention can include entering an absolute coordinate movement mode S51.

The absolute coordinate movement mode can be initiated when the 3D pointing device 10 enters the absolute coordinate area (A of FIG. 6). In the absolute coordinate movement mode, displaying S52 a cursor by positioning the cursor to correspond to a pointing direction of the 3D pointing device 10 can be carried out.

Switching to the absolute coordinate movement mode can be carried out by the user's operation. In other words, if the user pushes a particular button of the 3D pointing device 10, an absolute coordinate mode is activated, while a relative coordinate mode is activated if the particular button is not pushed by the user. In this setting, operation in the relative coordinate mode in the absolute coordinate area (A of FIG. 6) or operation in the absolute coordinate mode in the relative coordinate area (B of FIG. 6) can be made possible. The display unit 151 can display an indicator informing the user of a current operation mode.

Switching to the absolute coordinate movement mode can be accomplished by selection of an associated menu displayed in the display unit 151. For example, a pop-up window allowing selection between the absolute coordinate movement mode and the relative coordinate movement mode is displayed in the display unit 151; and the absolute coordinate mode and the relative coordinate mode can be switched to each other as the user selects the displayed pop-up window.

As shown in FIG. 20(a), the user can move the 3D pointing device 10 from the first device position 10A to the second device position 10B. If the user moves the 3D pointing device 10 from the first device position 10A to the second device position 10B, the cursor can also be moved from the first cursor position C1 to the second cursor position C2. The movement of the cursor can be made with respect to a predetermined absolute reference point (0). In other words, the coordinate of the 3D pointing device 10 after a movement is matched to the corresponding coordinate of the display unit 151 represented with respect to the absolute reference point (0).

As shown in FIG. 20(b), the user can move the 3D pointing device 10 from the second device position 10B to the third device position 10C. In this case, too, the cursor can be moved from the second cursor position C2 to the third cursor position C3 with respect to a predetermined absolute reference point (0).

According to a checking result about whether the 3D pointing device 10 has entered the relative coordinate area S53, a relative coordinate movement (70 of FIG. 5) can be carried out.

As shown in FIG. 21(a), the user can move the 3D pointing device 10 from the first device position 10A to the second device position 10B. At this time, the first device position 10A corresponds to the absolute coordinate area and the second device position 10B the relative coordinate area. The cursor can be displayed tracking the movement of the 3D pointing device 10 for an interval starting from the first cursor position C1 to the second cursor position C2. However, at the boundary area of the display unit 151 where the absolute coordinate area ends, the cursor fails to further track the 3D pointing device 10. Therefore, even if the 3D pointing device 10 moves to the second device position 10B, the cursor cannot be displayed at the first pointing position P1 corresponding to the second device position 10B.

As shown in FIG. 21(b), the user, by avoiding the absolute coordinate area, can move the 3D pointing device from the first pointing position P1 to the second pointing position P2. If the relative coordinate movement (S72 of FIG. 22) is not activated, the cursor still moves according to the properties of the absolute coordinate area. Therefore, since the 3D pointing device 10 has not entered the absolute coordinate area, the cursor may stay still at the second cursor position C2.

As shown in FIG. 21(c), the user can enter the absolute coordinate area from the relative coordinate area by moving the 3D pointing device 10. In other words, it implies that the pointing direction of the 3D pointing device 10 has been changed from the second pointing position P2, which belongs to the relative coordinate area, to the third cursor position C3. The controller (207 of FIG. 4), at the time of the pointing point corresponding to the 3D pointing device 10 enters from the relative coordinate area to the absolute coordinate area, can display the position of the cursor to conform to the properties of the absolute coordinate area. As described above, in the absolute coordinate area, the position of the cursor is determined with respect to the predetermined absolute reference point (0). Therefore, the cursor can be displayed by moving from the second cursor position C2 to the third cursor position C2 instantaneously. As the cursor is displayed according to moving to the third cursor position C3, the pointing direction of the 3D pointing device 10 and the display position of the cursor can correspond to each other. As the pointing direction of the 3D pointing device 10 and the display position of the cursor correspond to each other, the user can move the cursor in the absolute coordinate area according to his or her intuition.

Figure 22:
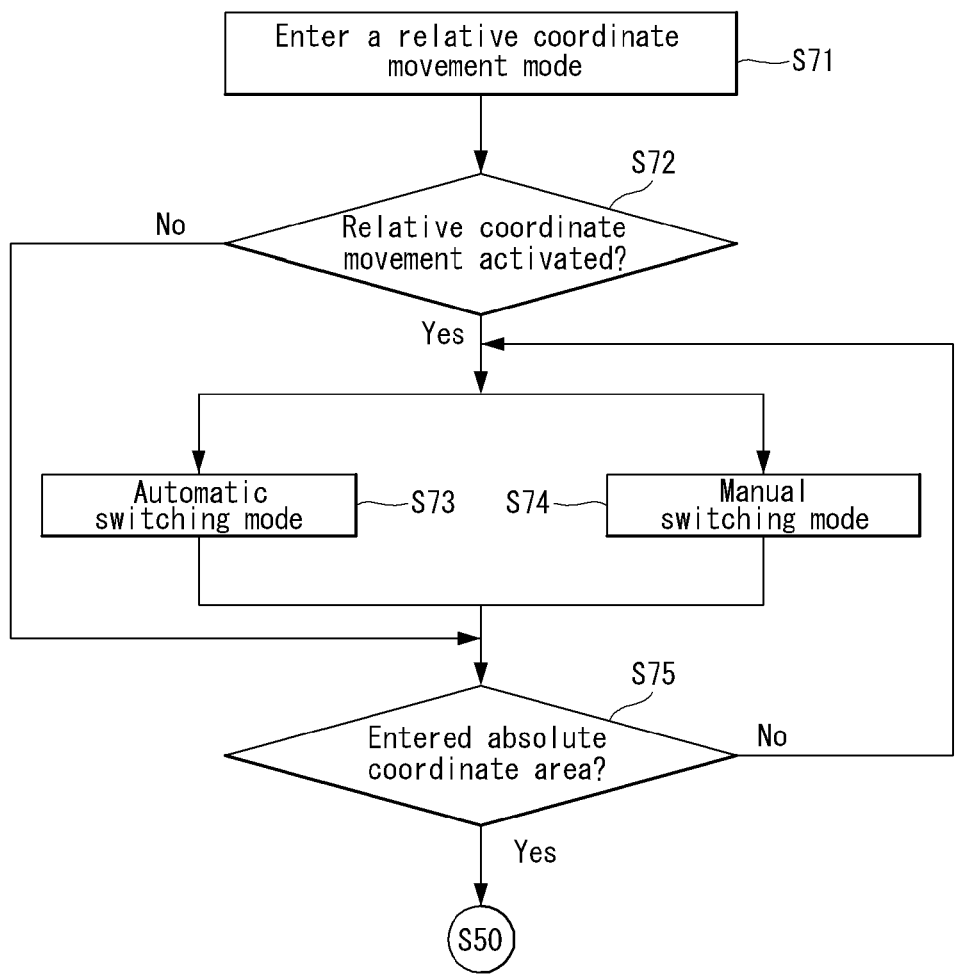
FIG. 22 illustrates a relative coordinate movement of FIG. 5.
Figure 23:
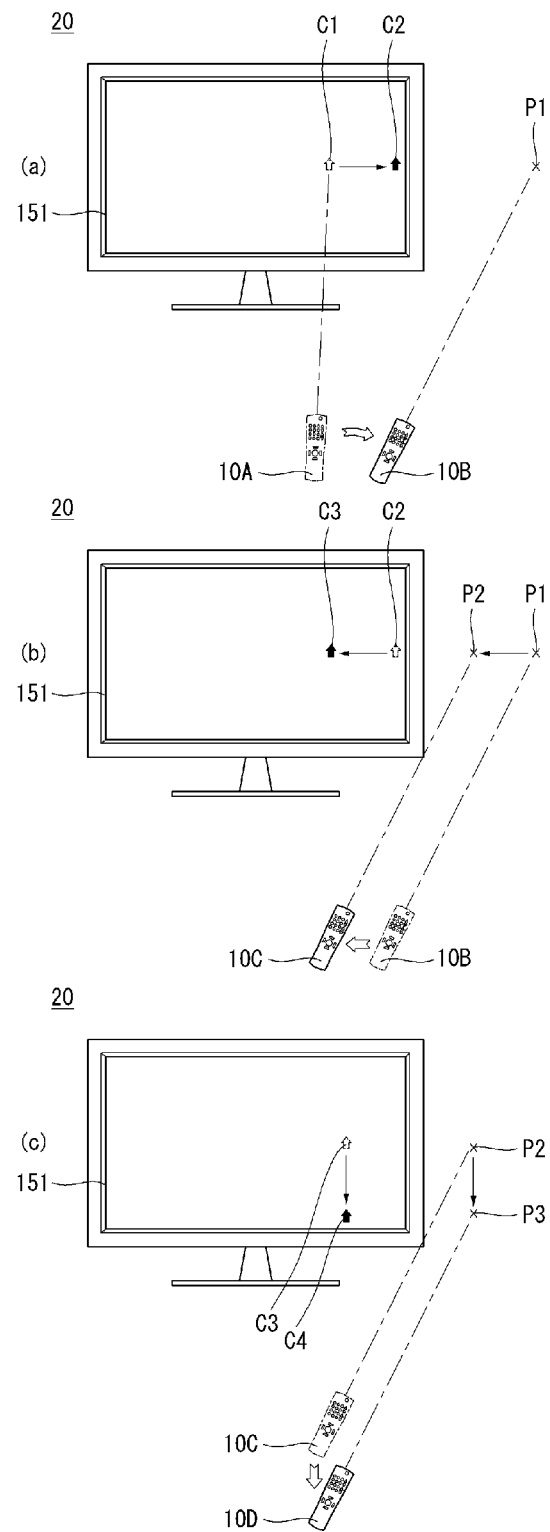
FIGS. 23 and 24 illustrate a procedure for switching between an absolute coordinate movement and a relative coordinate movement.
Figure 24:
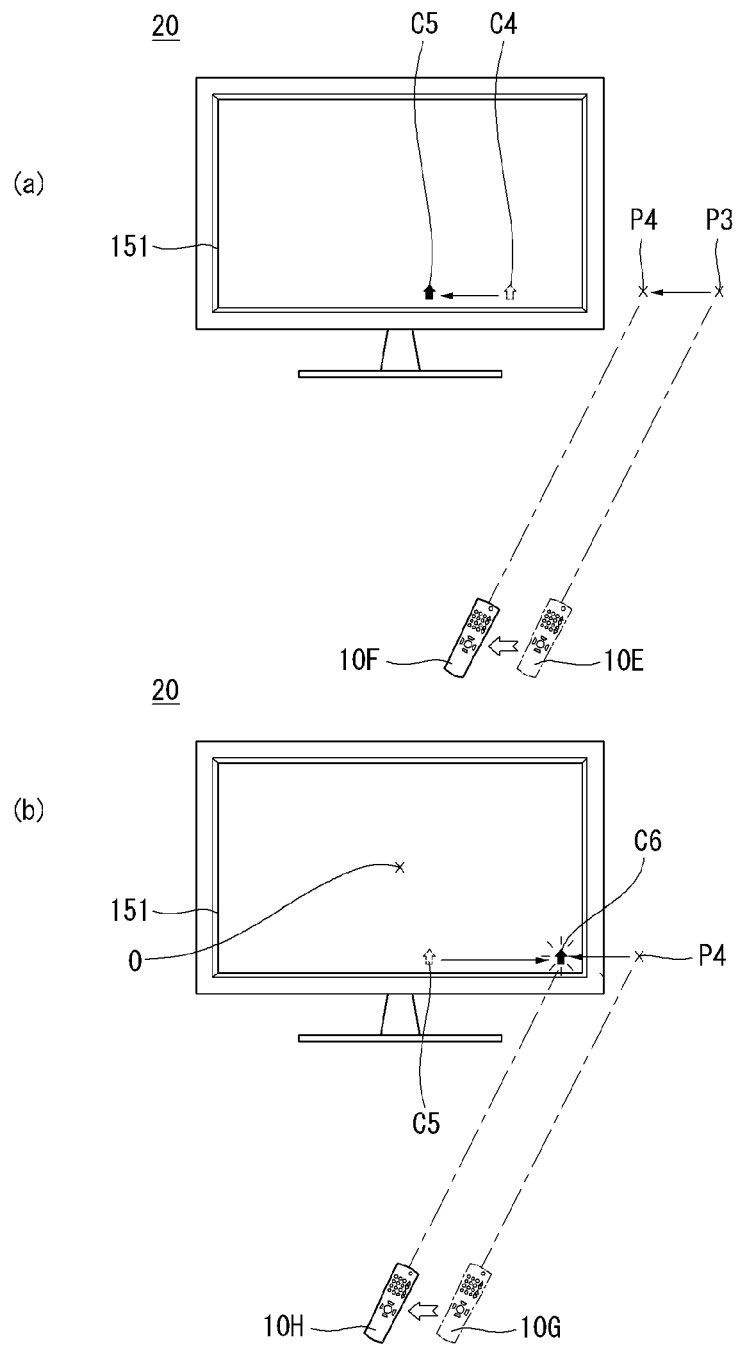

FIG. 22 illustrates a relative coordinate movement of FIG. 5; FIGS. 23 and 24 illustrate a procedure for switching between an absolute coordinate movement and a relative coordinate movement.

As shown in the figures, a relative coordinate movement (S70 of FIG. 5) can comprise entering a relative coordinate movement mode S71.

In the relative coordinate movement, determining whether relative coordinate movement has been activated S72 can be carried out.

Activation of the relative coordinate movement relates to whether an object displayed in the display unit 151 is made to correspond to the movement of the 3D pointing device 10 when the 3D pointing device 10 moves in the relative coordinate area. In other words, if the relative coordinate movement has been activated and the 3D pointing device 10 moves in the relative coordinate area, a cursor displayed in the display unit 151 can also move. However, when the relative coordinate movement is not activated, even if the 3D pointing device 10 moves in the relative coordinate area, a cursor displayed in the display unit 151 does not move. Activation of the relative coordinate movement, though described in detail at the corresponding part of this document, can be carried out in various ways.

When the relative coordinate movement has been activated, whether switching to a particular mode corresponds to an automatic switching mode S73 or a manual switching mode S74 can be determined.

The automatic switching mode indicates that the relative coordinate movement is activated simultaneously as the 3D pointing device 10 enters the relative coordinate area from the absolute coordinate area. The manual switching mode indicates that the relative coordinate movement is activated when the 3D pointing device 10 enters the relative coordinate area and the user performs a particular motion.

As shown in FIG. 23(a), the user can move the 3D pointing device 10 from the absolute coordinate area to the relative coordinate area.

As shown in FIGS. 23(b) and (c), the user can sequentially move the 3D pointing device 10 from the first pointing position P1 to the second pointing position P2 in the relative coordinate area and then from the second pointing position P2 to the third pointing position P3. At this time, if the relative coordinate movement is activated and a relative coordinate movement activation mode is switched automatically, the cursor can be moved sequentially from the second cursor position C2 to the third cursor position C3 and then to the fourth cursor position C4. In other words, even if the 3D pointing device 10 is moved in the relative coordinate area, the position of an object displayed in the display unit 151 can be changed to correspond to the movement of the 3D pointing device 10. However, the above situation is different from the movement of the cursor in the absolute coordinate area. That is to say, the cursor moves but not with respect to the absolute reference point. In this case, the cursor only moves to correspond to a relative distance and a relative direction between the first pointing position P1 and the second pointing position P2 and between the second pointing P3 and the third pointing position P4.

As shown in FIG. 24(a), the user can move the 3D pointing device 10 from the third pointing position P3 to the fourth pointing position P4; accordingly, the cursor can also move from the fourth cursor position C4 to the fifth cursor position C5.

As shown in FIG. 24(b), the user can move the 3D pointing device 10 continuously to make the 3D pointing device 10 enter the absolute coordinate area. At the moment the user moves the 3D pointing device 10 to a sixth device position 10H and makes the 3D pointing device 10 enter the absolute coordinate area from the relative coordinate area, the cursor makes a movement according to the properties of the absolute coordinate area. Therefore, the cursor can move by jumping from the fifth cursor position C5 to the sixth cursor position C6 corresponding to the sixth device position 10H. From the sixth cursor position C6 belonging to the absolute coordinate area, the pointing direction of the 3D pointing device 10 and the display position of the cursor can correspond to each other.

Figure 25:
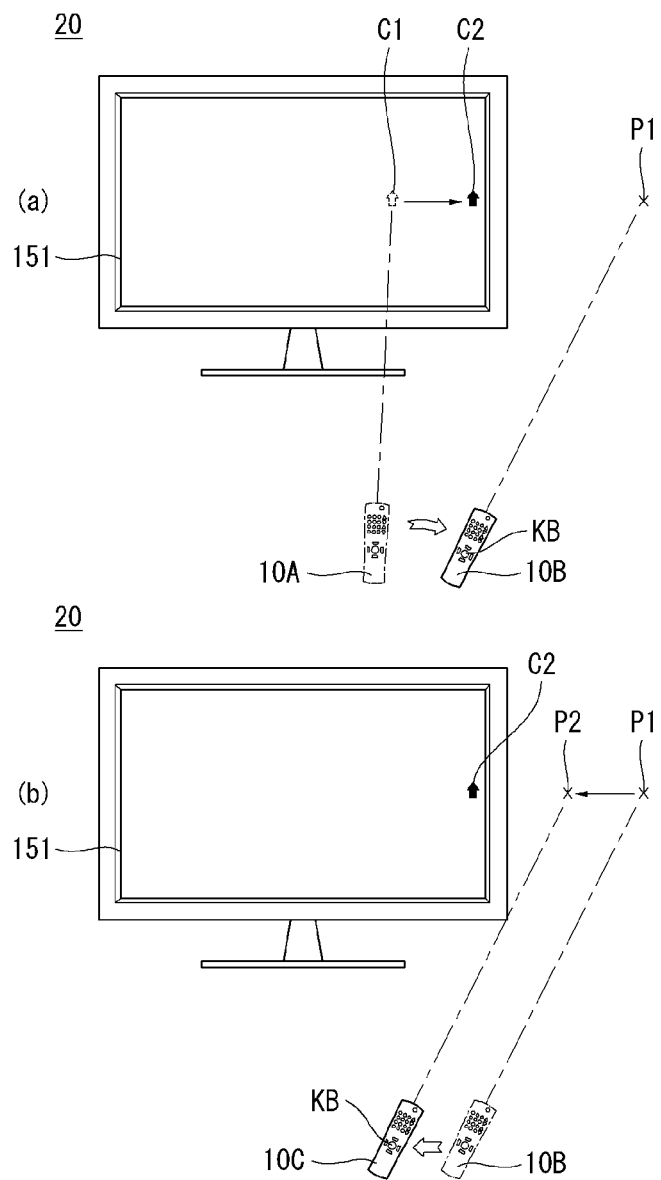
FIGS. 25 and 26 illustrate another procedure for switching between an absolute coordinate movement and a relative coordinate movement.
Figure 26:
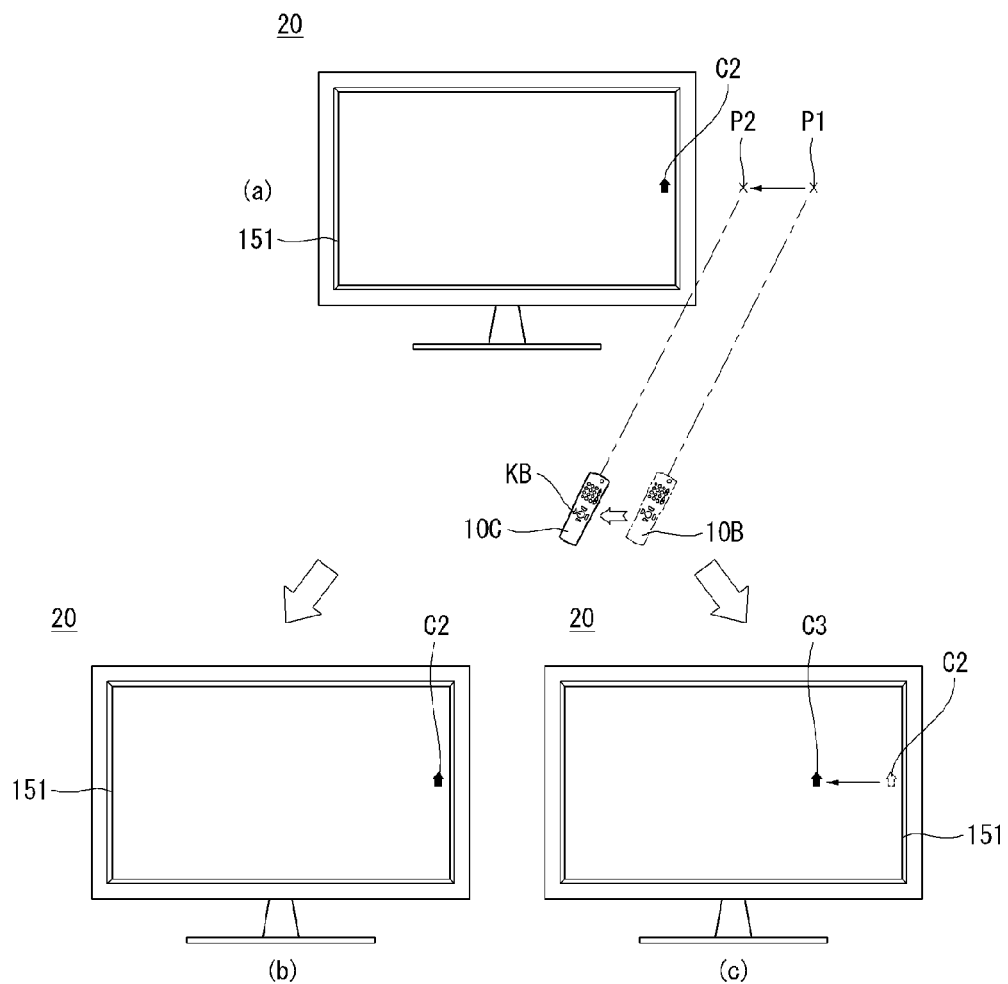

FIGS. 25 and 26 illustrate another procedure for switching between an absolute coordinate movement and a relative coordinate movement.

As shown in FIG. 25(a), the user can move the 3D pointing device 10 from the absolute coordinate area to the relative coordinate area.

As shown in FIG. 25(b), the user, while not pushing an activation key KB of the 3D pointing device 10, can move the 3D pointing device 10 from the second device position 10B to the third device position 10C. The activation key KB is a user input key allowing the cursor to move when the 3D pointing device 10 is moved in the relative coordinate area. Since the user has moved the 3D pointing device 10 without pushing the activation key KB, as shown in the figure, the cursor may not be moved. The following described the above situation in more detail.

As shown in FIG. 26(a), the user can move the 3D pointing device 10 from the second device position 10B to the third device position 10C. During the movement of the 3D pointing device 10, the user, with or without pushing the activation key KB, can manually determine whether to control an object in the relative coordinate area.

As shown in FIG. 26(b), if the user does not push the activation key KB, the cursor displayed in the display unit 151 may not move from the second cursor position C2.

As shown in FIG. 26(c), if the user pushes the activation key KB, the cursor displayed in the display unit 151 can move from the second cursor position C2 to the third cursor position C3 in accordance to the movement of the 3D pointing device 10 in the relative coordinate area.

Figure 27:
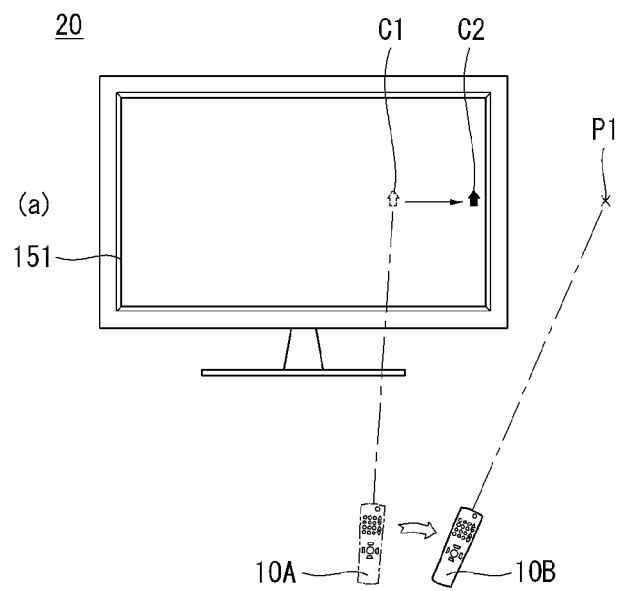
FIGS. 27 and 28 illustrate still another procedure for switching between an absolute coordinate movement and a relative coordinate movement.
Figure 27:
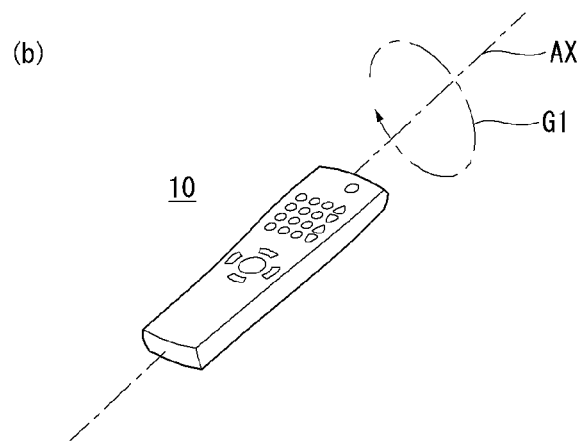
Figure 28:
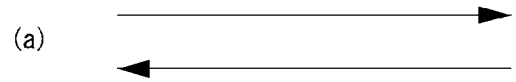
Figure 28:
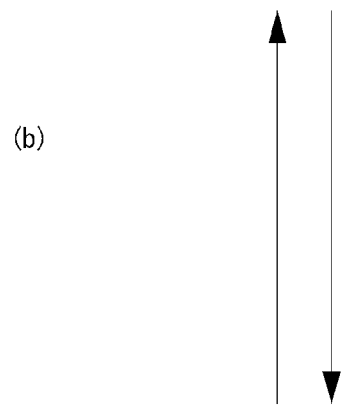
Figure 28:
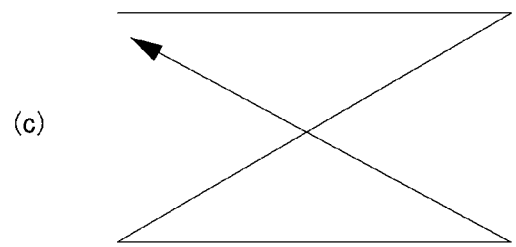
Figure 28:
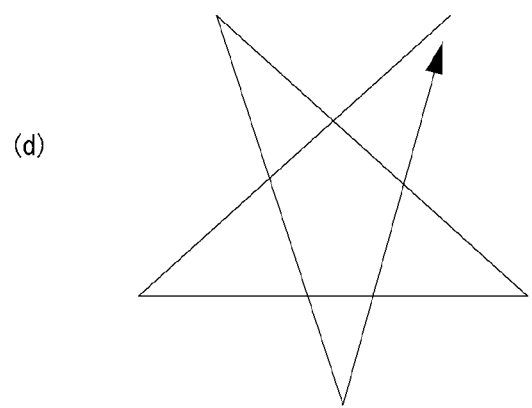

FIGS. 27 and 28 illustrate still another procedure for switching between an absolute coordinate movement and a relative coordinate movement.

As shown in the figures, the user, by using a gesture, can determine whether to move the cursor according to the movement of the 3D pointing device 10 in the relative coordinate area.

As shown in FIG. 27(a), the user can move the 3D pointing device 10 from the absolute coordinate area to the relative coordinate area.

As shown in FIG. 27(b), the user can move the 3D pointing device 10 to assume a gesture of rotation G1 around the longitudinal direction axis AX of the 3D pointing device 10. When the 3D pointing device 10 is positioned in the relative coordinate area; and the 3D pointing device 10 is moved in the relative coordinate area while a gesture G1 is taken, too, the cursor displayed in the display unit 151 can move in accordance to the movement of the 3D pointing device 10.

As shown in FIG. 28, various gestures are possible, including a gesture of left and right movement (a), a gesture of vertical movement (b), an 8-shape gesture, and a star-shape gesture.

Figure 29:
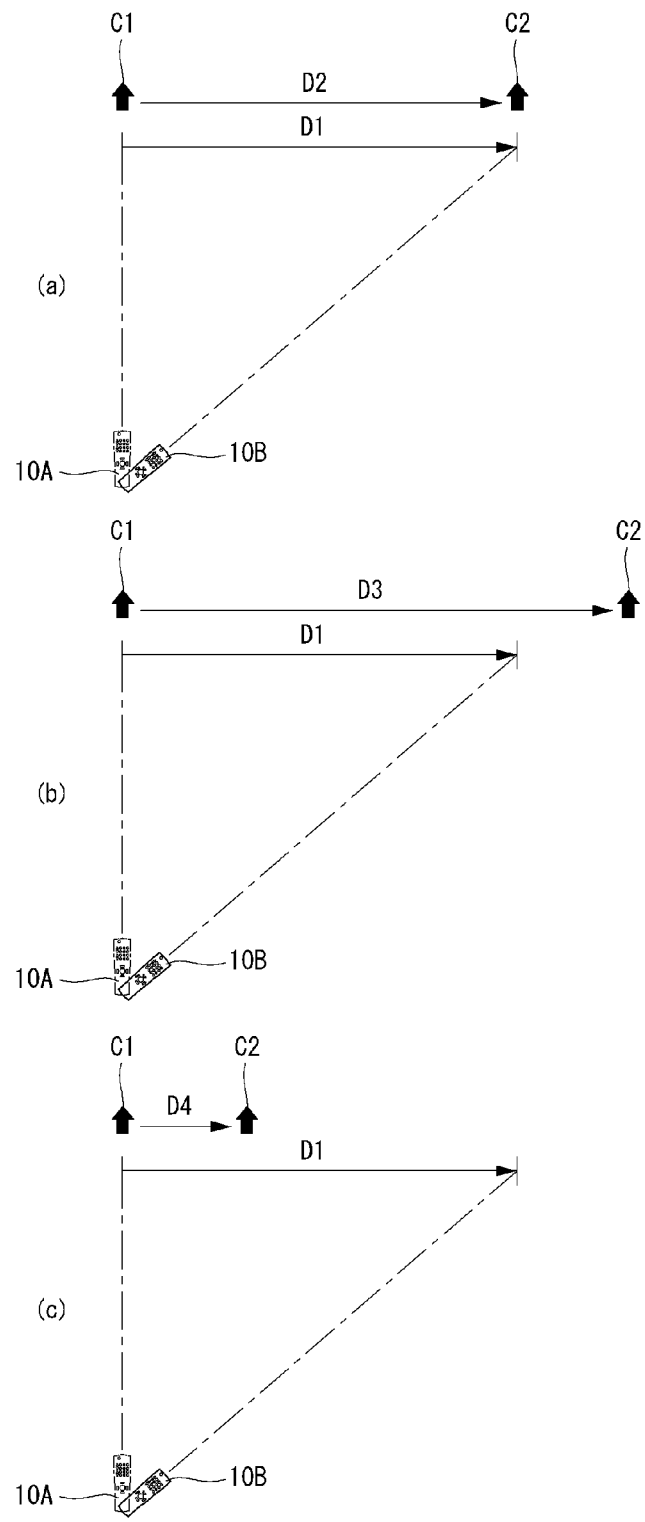
FIG. 29 illustrates one procedure for adjusting sensitivity of a 3D pointing device.

FIG. 29 illustrates one procedure for adjusting sensitivity of a 3D pointing device.

As shown in the figure, the distance traveled by the cursor can be different according to the actual distance traveled by the 3D pointing device 10 and the movement of the 3D pointing device 10.

As shown in FIG. 29(a), if the 3D pointing device is moved from the first device position 10A to the second device position 10B, the pointing direction of the 3D pointing device 10 can be shifted by D1 and the controller (207 of FIG. 4) can make the cursor move displayed in the display unit 151 by D2 from the first cursor position C1 to the second cursor position C2. At this time, D1 and D2 represent actually the same distance. In other words, the distance generated by the movement of the 3D pointing device 10 and the distance by the movement of the cursor can be expressed with the same sensitivity.

As shown in FIG. 29(b), the user can move the 3D pointing device 10 by D1 and the controller (207 of FIG. 4) can make the cursor move by D3. At this time, D3 can be longer than D1. In other words, by adjusting the 3D pointing device 10 to have better sensitivity, a distance by the movement of the cursor can be made to be larger even with a small movement of the 3D pointing device 10.

As shown in FIG. 29(c), the user can move the 3D pointing device 10 by D1 and the controller (207 of FIG. 4) can be made to move by D4. At this time, D4 can be shorter than D1. In other words, by adjusting the 3D pointing device 10 to be less sensitive, a distance by the movement of the cursor can be made to be shorter even with a large movement of the 3D pointing device 10.

Figure 30:
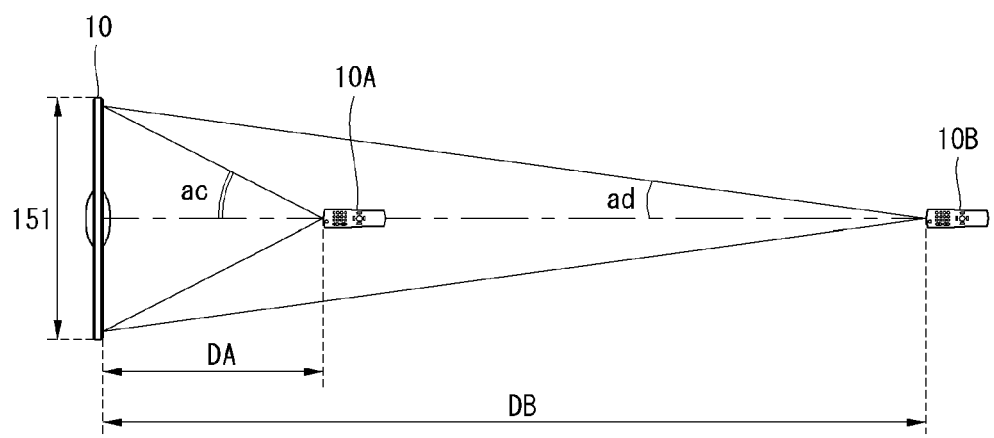
FIGS. 30 and 31 illustrate another procedure for adjusting sensitivity of a 3D pointing device.
Figure 31:
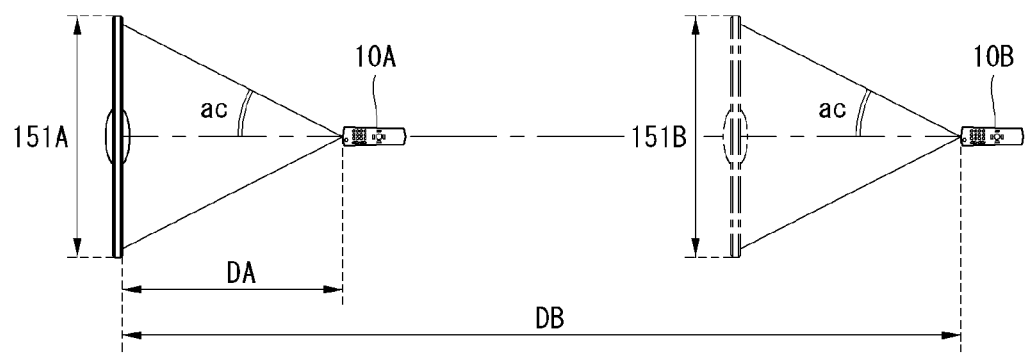

FIGS. 30 and 31 illustrate another procedure for adjusting sensitivity of a 3D pointing device.

As shown in the figures, a display device 20 according to one embodiment of the present invention can adjust sensitivity of the 3D pointing device 10 by taking account of the distance between the 3D pointing device 10 and the display device 20.

As shown in FIG. 30, the user can operate the 3D pointing device 10 at the first device position 10A or at the second device position 10B away from the display device 20. The first device position 10A can be separated from the display device 20 by a distance of DA and the second device position 10B by a distance of DB.

Measured at the first device position 10A, the width of the absolute coordinate area amounts to ac*2 degrees with respect to the center of the display device 20. On the other hand, at the second device position 10B, the width of the absolute coordinate area amounts to ad*2 degrees with respect to the center of the display device 20. Therefore, the user should move with a small angular distance at the second device position 10B while with a large angular degrees at the first device position 10A. If there exists such a difference, accurate operation of a menu displayed in the display unit 151 may be difficult at the second device position 10B.

As shown in FIG. 31, when the 3D pointing device 10 is positioned at the second device position 10B, the controller (207 of FIG. 4) can control the display device 20 as if a virtual display unit 151B is placed in front of the 3D pointing device 10. In other words, a virtual display unit 151B can be assumed to exist at a position where the virtual display unit 151B has the same width as the actual display unit 151A.

The distance between the 3D pointing device 10 and the display device 20 can be obtained through the range finding sensor (109 of FIG. 3). The range finding sensor (109 of FIG. 3) can employ an ultrasonic sensor or an infrared sensor.

By maintaining the width of the absolute coordinate area identically irrespective of the distance between the 3D pointing device 10 and the display device 20, the user can manipulate the 3D pointing device 10 with the same feeling independently of a distance between the user and the display device 20.

Figure 32:
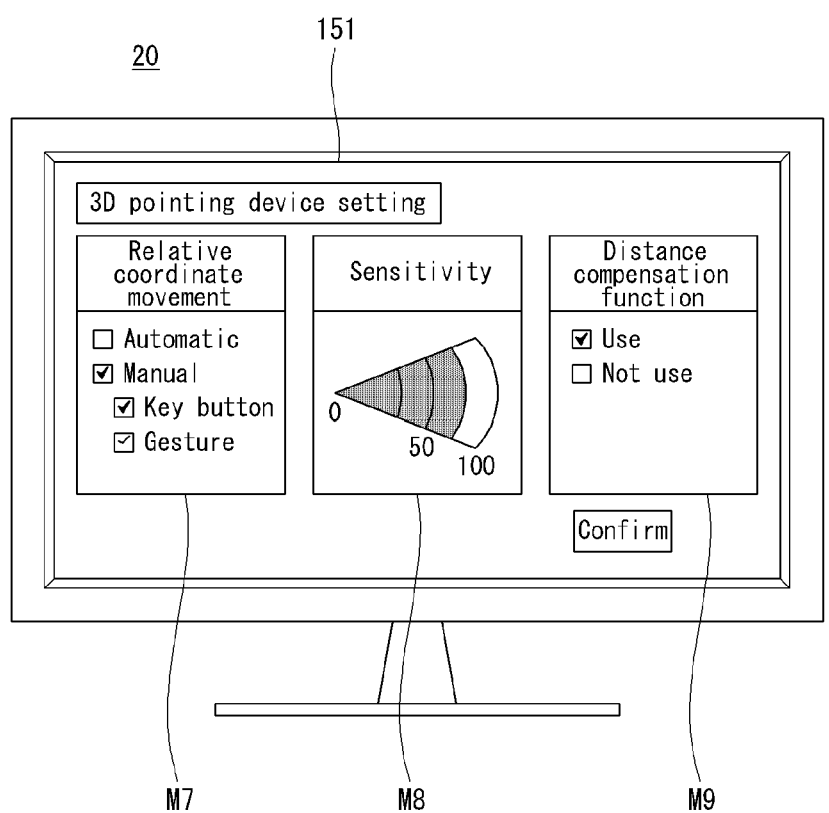
FIG. 32 illustrates a screen for setting up the operation of a 3D pointing device.

FIG. 32 illustrates a screen for setting up the operation of a 3D pointing device.

As shown in the figure, the display device 20 according to one embodiment of the present invention can provide a screen for setting up the 3D pointing device 10.

A seventh pop-up window M7 can be used for setting up a configuration of relative coordinate movement; an eighth pop-up window M8 can be used to adjust sensitivity; and a ninth pop-up window M9 can be used to set up whether to use a function for compensating a viewing distance.

Figure 33:
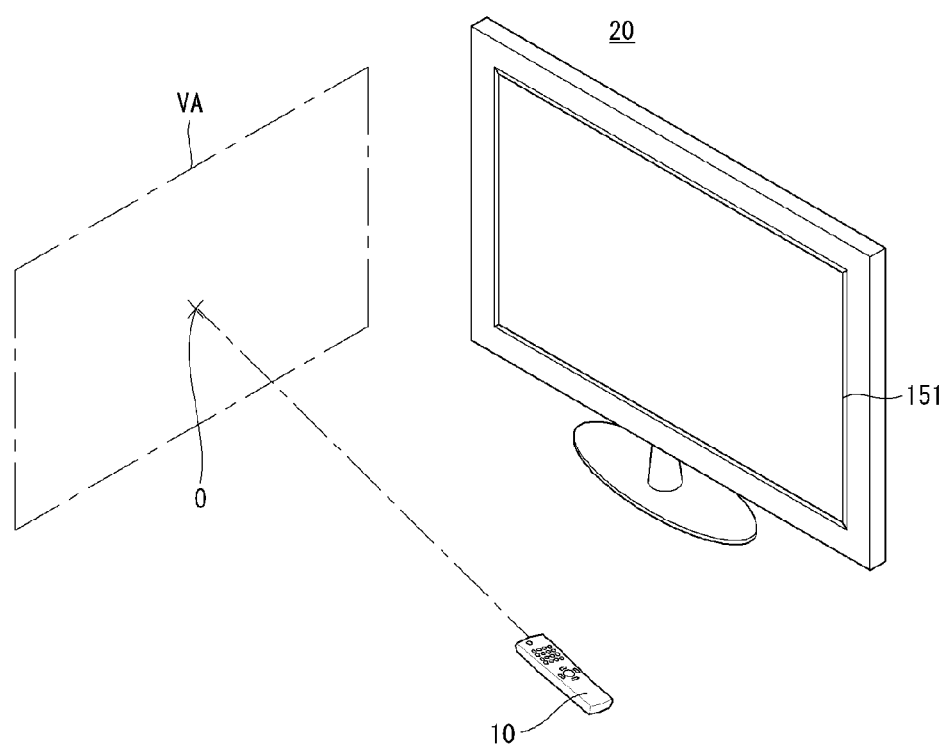
FIGS. 33 and 34 illustrate a procedure for setting up an absolute coordinate area.
Figure 34:
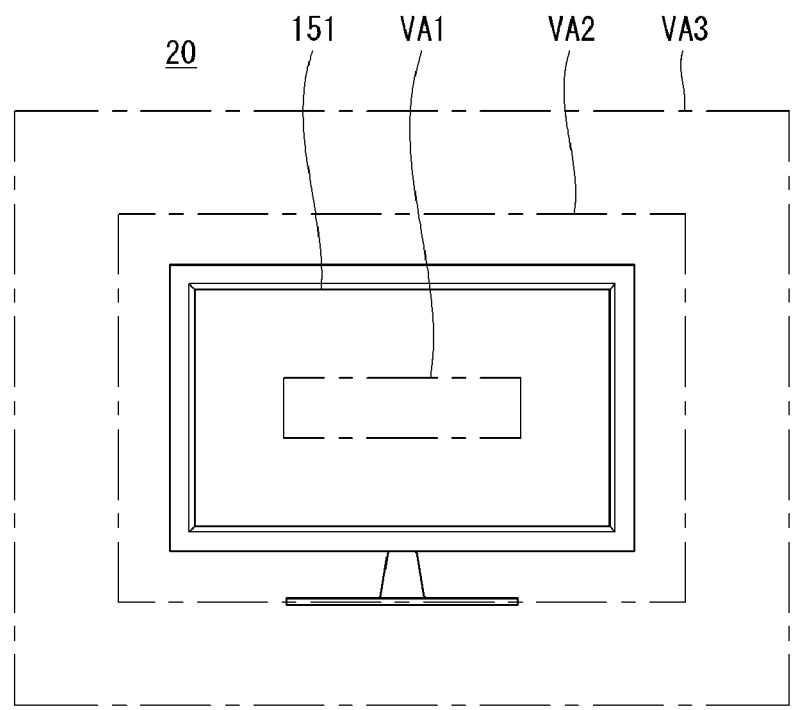

FIGS. 33 and 34 illustrate a procedure for setting an absolute coordinate area.

As shown in the figures, the display device 20 according to one embodiment of the present invention allows the user to set up the scope of the absolute coordinate area at the user's needs.

As shown in FIG. 33, the user can set a virtual area VA as the absolute coordinate area rather than the display unit 151. For example, if the user is positioned in front of the display unit 151 and an operator is positioned at the user's side facing the virtual area VA, setting up the absolute coordinate area in the display unit 151 may not be convenient. Therefore, in this case, the user can set up a virtual area VA and set up one point of the virtual area VA as the absolute reference point (0). Therefore, if a pointing point of the 3D pointing device 10 is moved within the virtual area VA, the absolute coordinate movement with respect to the absolute reference point (0) is performed.

As shown in FIG. 34, the user can set up the absolute coordinate area in a smaller area VA1 or in a larger area VA2, VA3 than the display unit 151. For example, if the user is located far away from the display unit 151 and thus, a required manipulation feeling is not obtained even when a function of adjusting a viewing distance is utilized, the required manipulation feeling can be obtained by enlarging the absolute coordinate area VA2, VA3.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
a display unit configured to display an object;
a receiver configured to receive a wireless signal from a three dimensional (3D) pointing device sensing a three dimensional motion comprising a pointing point indicated by the three dimensional pointing device; and
a controller configured to:
calculate a trajectory of the 3D pointing device corresponding to at least one of an absolute coordinate area and a relative coordinate area based on the received wireless signal and determine a position of the displayed object according to a property of an area to which the trajectory belongs,
calculate the trajectory based on a predetermined absolute reference point when the pointing point belongs to the absolute coordinate area, and the trajectory based on a relative position of the point when the pointing point belongs to the relative coordinate area,
wherein the absolute coordinate area is within the display unit and the relative coordinate area is outside of the display unit which does not overlap the absolute coordinate area,
change the position of the displayed object based on movements of the 3D pointing device when the 3D pointing device moves on the absolute coordinate area,
stay the position of the displayed device moves on the relative coordinate area, and
when the 3D pointing device re-enters into the absolute coordinate area from the relative coordinate area, change the position of the displayed object from the stayed position to the re-entered position.

2. The display device of claim 1, wherein the controller changes a position of the object according to the property of the absolute coordinate area for a trajectory belonging to the absolute coordinate area out of the calculated trajectory and changes a position of the object according to the property of the relative coordinate area for a trajectory belonging to the relative coordinate area out of the calculated trajectory.

3. The display device of claim 1, wherein the controller, if the calculated trajectory enters the relative coordinate area from the absolute coordinate area, determines whether to change a position of the displayed object according to a trajectory corresponding to the relative coordinate area.

4. The display device of claim 3, wherein the controller determines whether to change a position of the displayed object according to a predetermined switching mode comprising an automatic switching mode and a manual switching mode.

5. The display device of claim 1, wherein the controller, if the calculated trajectory enters the absolute coordinate area from the relative coordinate area, determines a position of the object to correspond to the trajectory which has entered the absolute coordinate area.

6. The display device of claim 1, wherein the controller calculates the trajectory based on a signal included in the wireless signal, the signal included in the wireless signal corresponding to signals sensed by at least multiple sensors from among a geomagnetic sensor, an accelerometer, and a gyro sensor.

7. The display device of claim 6, wherein the controller uses at least multiple signals from among the geomagnetic sensor, the accelerometer, and the gyro sensor for calculating a trajectory in the absolute coordinate area.

8. The display device of claim 1, wherein the controller calculates the trajectory by using the wireless signal transmitted from the 3D pointing device, the wireless signal being based on signals coming from at least multiple sensors from among a geomagnetic sensor, an accelerometer, and a gyro sensor.

9. The display device of claim 1, wherein the controller determines the position by changing the trajectory with a predetermined ratio.

10. The display device of claim 9, wherein the controller determines the ratio according to a distance between the 3D pointing device and the display device.

11. The display device of claim 10, wherein the controller determines the ratio in proportion to a distance between the 3D pointing device and the display device.

12. The display device of claim 9, wherein the controller makes the trajectory magnified or reduced according to the ratio.

13. The display device of claim 1, wherein the controller determines the absolute reference point with respect to one point of the absolute coordinate area.

14. The display device of claim 1, wherein the object corresponds to at least one of a cursor, a pointer, and an indicator displayed in the display unit.

15. The display device of claim 1, wherein the controller sets the absolute coordinate area to be actually the same as the display unit area.

16. The display device of claim 1, wherein the 3D pointing device recognizes the three dimensional motion by using at least multiple sensors from among a geomagnetic sensor, an accelerometer, and a gyro sensor.

17. A display device, comprising:
a display unit configured to display an object;
a receiver configured to receive a wireless signal from a three dimensional (3D) pointing device recognizing a three dimensional motion; and
a controller configured to:
determine a pointing point at which the 3D pointing device points based on the received wireless signal and determine a position of the displayed object according to a property of an area to which the determined pointing point belongs between an absolute coordinate area and a relative coordinate area and display the determined position,
wherein the absolute coordinate area is within the display unit and the relative coordinate area is outside of the display unit which does not overlap the absolute coordinate area,
change the position of the displayed object based on movements of the 3D pointing device when the 3D pointing device moves on the absolute coordinate area,
stay the position of the displayed object when the 3D pointing device moves on the relative coordinate area, and
when the 3D pointing device re-enters into the absolute coordinate area from the relative coordinate area, change the position of the displayed object from the stayed position to the re-entered position.

18. The display device of claim 17, wherein the controller determines a position of the displayed object with respect to an absolute reference point if the determined pointing point belongs to the absolute coordinate area and determines a position of the displayed object based on a relative position from a pointing point before the determined pointing point if the determined pointing point belongs to the relative coordinate area.

19. The display device of claim 18, wherein the controller determines the absolute reference point with respect to one point of the absolute coordinate area.

20. The display device of claim 17, wherein the controller, if the determined pointing point belongs to the absolute coordinate area and a pointing point before the determined pointing point belongs to the relative coordinate area, determines whether to continue changing a position of the displayed object.

21. The display device of claim 17, wherein the controller, if the determined pointing point belongs to the relative coordinate area and a pointing point before the determined pointing point belongs to the absolute coordinate area, determines a position of the displayed object as the determined pointing point.

22. The display device of claim 17, wherein the controller determines the pointing point based on the wireless signal transmitted from the 3D pointing device, the wireless signal being based on a signal obtained from at least outputs of multiple sensors from among a geomagnetic sensor, an accelerometer, and a gyro sensor or based on at least multiple signals from among the geomagnetic sensor, the accelerometer, and the gyro sensor.

23. The display device of claim 22, wherein the controller uses a signal of the geomagnetic sensor to calculate a trajectory in the absolute coordinate area.

24. The display device of claim 17, wherein the controller determines the position by changing the trajectory with a predetermined ratio.

25. The display device of claim 17, wherein the controller sets the absolute coordinate area to be actually the same as the display unit area.

26. A display device, comprising:
a display unit configured to display an object;
a receiver configured to receive a wireless signal from a three dimensional (3D) pointing device recognizing a three dimensional motion through a sensor unit; and
a controller configured to:
calculate a trajectory of the 3D pointing device corresponding to at least one of an absolute coordinate area and a relative coordinate area based on the received wireless signal and determine a position of the displayed object according to a property of an area to which the trajectory belongs and displaying the determined position,
wherein the absolute coordinate area corresponds to an area where the trajectory is calculated with respect to a predetermined absolute reference point and the relative coordinate area corresponds to an area where the trajectory is calculated based on relative positions of points forming the trajectory, and
wherein the absolute coordinate area is within the display unit and the relative coordinate area is outside of the display unit which does not overlap the absolute coordinate area,
change the position of the displayed object based on movements of the 3D pointing device when the 3D pointing device moves on the absolute coordinate area,
stay the position of the displayed object when the 3D pointing device moves on the relative coordinate area, and
when the 3D pointing device re-enters into the absolute coordinate area from the relative coordinate area, change the position of the displayed object from the stayed position to the re-entered position.

27. A control method for a display device, the control method comprising:
receiving a wireless signal from a 3D pointing device;
calculating a trajectory of the 3D pointing device belonging to at least one area between an absolute coordinate area and a relative coordinate area based on the received wireless signal, and a first determination for determining a position change of an object displayed in a display unit according to a property of an area to which the trajectory belongs,
wherein the absolute coordinate area corresponds to an area where the trajectory is calculated with respect to a predetermined absolute point and the relative coordinate area corresponds to an area where the trajectory is calculated based on relative positions of points forming the trajectory, and
wherein the absolute coordinate area is within the display unit and the relative coordinate area is outside of the display unit which does not overlap the absolute coordinate area;
changing the position of the displayed object based on movements of the 3D pointing device when the 3D pointing device moves on the absolute coordinate area;
staying the position of the displayed object when the 3D pointing device moves on the relative coordinate area; and
when the 3D pointing device re-enters into the absolute coordinate area from the relative coordinate area, changing the position of the displayed object from the stayed position to the re-entered position.

28. The control method of claim 27, wherein the first determination comprises:
a second determination of determining position change of the object according to a property of the absolute coordinate area for a trajectory belonging to the absolute coordinate area out of the calculated trajectory; and
a third determination of determining position change of the object according to a property of the relative coordinate area for a trajectory belonging to the relative coordinate area out of the calculated trajectory.

29. The control method of claim 28, further comprising a fourth determination of determining whether to change a position of the displayed object according to a trajectory belonging to the relative coordinate area if the calculated trajectory enters from the absolute coordinate area to the relative coordinate area.

30. The control method of claim 29, wherein whether to continue changing a position of the displayed object is determined by a predetermined switching mode and the switching mode comprises an automatic switching mode and a manual switching mode.

31. The control method of claim 27, if the calculated trajectory enters from the relative coordinate area to the absolute coordinate area, further comprising a fifth determination of determining a position of the object to correspond to the trajectory which has entered the absolute coordinate area.

32. The control method of claim 27, wherein the trajectory is calculated based on a signal obtained from outputs of multiple sensors from among a geomagnetic sensor, an accelerometer, and a gyro sensor, the signal being included in the wireless signal.

33. The control method of claim 32, wherein at least multiple signals from among the geomagnetic sensor, the accelerometer, and the gyro sensor are used for calculating a trajectory in the absolute coordinate area.

34. The control method of claim 27, wherein the trajectory is calculated by using the wireless signal transmitted from the 3D pointing device, the wireless signal being based on signals coming from at least multiple sensors from among a geomagnetic sensor, an accelerometer, and a gyro sensor.

35. The control method of claim 27, wherein the first determination comprises a fifth determination of determining the position change by changing the trajectory with a predetermined ratio.

36. The control method of claim 35, wherein the ratio is determined according to a distance between the 3D pointing device and the display device.

37. The control method of claim 36, wherein the ratio is determined in proportion to a distance between the 3D pointing device and the display device.

38. The control method of claim 35, wherein the ratio is used to make the trajectory magnified or reduced.

39. The control method of claim 27, further comprising setting up the absolute reference point.

40. The control method of claim 39, wherein the setting up the absolute reference point comprises:
setting up a target area in one point of the absolute coordinate area; and
indicating for the 3D pointing device to direct towards the target area.

41. The control method of claim 39, wherein the absolute reference point is set up while pairing up the 3D pointing device with the display device.

42. The control method of claim 27, wherein the object corresponds to at least one of a cursor, a pointer, and an indicator displayed on the display unit.

43. The control method of claim 27, wherein the absolute coordinate area is set up to be actually the same as the display unit area.

* * * * *